United States Patent
Pyle et al.

(10) Patent No.: US 9,695,372 B2
(45) Date of Patent: Jul. 4, 2017

(54) METHODS OF PRODUCING ORGANIC PRODUCTS WITH PHOTOSYNTHETIC ORGANISMS

(75) Inventors: Jason Pyle, Del Mar, CA (US); Alex Aravanis, San Diego, CA (US)

(73) Assignee: Sapphire Energy, Inc., San Diego, CA (US)

( * ) Notice: Subject to any disclaimer, the term of this patent is extended or adjusted under 35 U.S.C. 154(b) by 1921 days.

(21) Appl. No.: 12/208,264

(22) Filed: Sep. 10, 2008

(65) Prior Publication Data

US 2009/0087890 A1    Apr. 2, 2009

Related U.S. Application Data

(60) Provisional application No. 60/971,418, filed on Sep. 11, 2007, provisional application No. 60/971,412, filed on Sep. 11, 2007, provisional application No. 60/973,924, filed on Sep. 20, 2007, provisional application No. 61/130,892, filed on Jun. 2, 2008.

(51) Int. Cl.
| | |
|---|---|
| *C10L 1/02* | (2006.01) |
| *C10L 1/04* | (2006.01) |
| *C10L 1/14* | (2006.01) |
| *C10L 1/16* | (2006.01) |
| *C10L 1/185* | (2006.01) |
| *G06Q 40/04* | (2012.01) |

(52) U.S. Cl.
CPC ...... *C10L 1/02* (2013.01); *C10L 1/04* (2013.01); *C10L 1/14* (2013.01); *C10L 1/1608* (2013.01); *C10L 1/1852* (2013.01); *G06Q 40/04* (2013.01)

(58) Field of Classification Search
CPC ...... C10L 1/02; C10L 1/04; C10L 1/14; C10L 1/1608; C10L 1/1852; G06Q 40/04
USPC .................................................. 435/289.1
See application file for complete search history.

(56) References Cited

U.S. PATENT DOCUMENTS

| | | | |
|---|---|---|---|
| 4,297,109 A | 10/1981 | Sugito et al. | |
| 4,341,038 A | 7/1982 | Bloch et al. | |
| 4,795,479 A | 1/1989 | Karol | |
| 5,451,513 A | 9/1995 | Maliga et al. | |
| 5,545,817 A | 8/1996 | Mcbride et al. | |
| 5,545,818 A | 8/1996 | Mcbride et al. | |
| 5,607,486 A | 3/1997 | Wilkins, Jr. | |
| 5,661,017 A | 8/1997 | Dunahay et al. | |

(Continued)

FOREIGN PATENT DOCUMENTS

| | | |
|---|---|---|
| EP | 0904095 B1 | 9/2002 |
| JP | 4-110395 A | 4/1992 |

(Continued)

OTHER PUBLICATIONS

Disch et al. Distribution of the mevalonate and glyceraldehyde phosphate/pyruvate pathways for isoprenoid biosynthesis in unicellular algae and the cyanobacterium Synechocystis PCC 6714. Biochem J. Jul. 15, 1998;333 ( Pt 2):381-388.

(Continued)

*Primary Examiner* — Gautam Prakash
(74) *Attorney, Agent, or Firm* — Arnold & Porter Kaye Scholer LLP; David R. Marsh; Curtis R. Altmann

(57) ABSTRACT

Provided herein are compositions and methods for producing products by photosynthetic organisms. The photosynthetic organisms can be genetically modified to effect production, expression, or both, of products. The methods and compositions are particularly useful in the petrochemical industry.

19 Claims, 5 Drawing Sheets

(56) References Cited

U.S. PATENT DOCUMENTS

| | | |
|---|---|---|
| 5,693,507 A | 12/1997 | Daniell et al. |
| 5,871,988 A | 2/1999 | Croteau et al. |
| 5,958,761 A | 9/1999 | Yogev et al. |
| 6,072,045 A | 6/2000 | Chappell et al. |
| 6,083,740 A | 7/2000 | Kodo et al. |
| 6,297,054 B1 | 10/2001 | Maliga et al. |
| RE37,629 E | 4/2002 | Wilkins, Jr. |
| 6,495,354 B2 | 12/2002 | Chappell et al. |
| 6,680,426 B2 | 1/2004 | Daniell et al. |
| 6,872,516 B2 | 3/2005 | Evans et al. |
| 7,030,294 B2 | 4/2006 | Lebel et al. |
| 7,129,392 B2 | 10/2006 | Hahn et al. |
| 7,172,886 B2 | 2/2007 | Keasling et al. |
| 7,259,293 B2 | 8/2007 | Staub |
| 2001/0051359 A1 | 12/2001 | Ohto et al. |
| 2002/0106772 A1 | 8/2002 | Croteau et al. |
| 2003/0148479 A1 | 8/2003 | Keasling et al. |
| 2003/0166255 A1 | 9/2003 | Chappell et al. |
| 2003/0219798 A1 | 11/2003 | Gokarn et al. |
| 2004/0014174 A1 | 1/2004 | Mayfield et al. |
| 2004/0055209 A1 | 3/2004 | Jakkula et al. |
| 2004/0074760 A1 | 4/2004 | Portnoff et al. |
| 2004/0161819 A1 | 8/2004 | Aharoni et al. |
| 2005/0154669 A1 | 7/2005 | Streetman |
| 2005/0204417 A1 | 9/2005 | Croteau et al. |
| 2005/0239182 A1 | 10/2005 | Berzin |
| 2005/0260553 A1 | 11/2005 | Berzin et al. |
| 2005/0287655 A1 | 12/2005 | Tabata et al. |
| 2006/0194975 A1 | 8/2006 | Narayan et al. |
| 2006/0234368 A1 | 10/2006 | Fukuda et al. |
| 2007/0048848 A1 | 3/2007 | Sears |
| 2007/0048859 A1 | 3/2007 | Sears |
| 2007/0077616 A1 | 4/2007 | Keasling et al. |
| 2007/0092931 A1 | 4/2007 | Keasling et al. |
| 2007/0099261 A1 | 5/2007 | Keasling et al. |
| 2008/0038805 A1 | 2/2008 | Melis |
| 2008/0098645 A1 | 5/2008 | Renninger et al. |
| 2008/0171378 A1 | 7/2008 | Keasling et al. |
| 2009/0061493 A1 | 3/2009 | Trimbur et al. |
| 2009/0215140 A1 | 8/2009 | Kurano et al. |

FOREIGN PATENT DOCUMENTS

| | | |
|---|---|---|
| WO | WO 95/16783 A1 | 6/1995 |
| WO | WO 98/31823 A1 | 7/1998 |
| WO | WO 01/64929 A1 | 9/2001 |
| WO | WO 01/72959 A2 | 9/2001 |
| WO | WO 01/72959 A3 | 5/2002 |
| WO | WO 2006/109588 A1 | 10/2006 |
| WO | WO 2006/111924 A2 | 10/2006 |
| WO | WO 2007/005604 A2 | 1/2007 |
| WO | WO 2007/013899 A2 | 2/2007 |
| WO | WO 2007/025145 A2 | 3/2007 |
| WO | WO 2006/111924 A3 | 4/2007 |
| WO | WO 2007/133558 A2 | 11/2007 |
| WO | WO 2008/003078 A2 | 1/2008 |
| WO | WO 2008/003078 A3 | 7/2008 |

OTHER PUBLICATIONS

Affek, et al. Natural abundance carbon isotope composition of isoprene reflects incomplete coupling between isoprene synthesis and photosynthetic carbon flow. Plant Physiol. Apr. 2003;131(4):1727-36.

Akin, et al. Removal of CO2 from flue gases by algae. Final technical report to DoE, USA. Available at http://www.oilgae.com/blog/2007/02/removal-of-co2-from-flue-gases-by-algae.html. Accessed Sep. 19, 2007.

Bateman, et al. Tools for chloroplast transformation in Chlamydomonas: expression vectors and a new dominant selectable marker. Mol Gen Genet. Apr. 2000;263(3):404-10.

Bock, R. Transgenic plastids in basic research and plant biotechnology. J Mol Biol. Sep. 21, 2001;312(3):425-38.

Carrer, et al. Kanamycin resistance as a selectable marker for plastid transformation in tobacco. Mol Gen Genet. Oct. 1993;241(1-2):49-56.

Christou, P. Transformation technology . Trends in Plant Science. 1996; 1:423-431.

Cohen, et al. Translational Regulation of Chloroplast Gene Expression in Chlamydomonas reinhardtii. Meth. Enzymol. 1998;297:192-208.

Criss, R. Stable Isotope Distribution: Variations From Temperature, Organic and Water-Rock Interactions. Global earth physics a handbook of physical constants. Edited by Thomas J. Ahrens. AGU reference shelf Series. Publisher: Washington, DC American Geophysical Union 1995; 1:292-307.

Farquhar, et al. Carbon isotope discrimination and photosynthesis. Annu. Rev. Plant Physiol. Plant Mol. Biol. 1989; 40:503-537.

Fisseha, et al. Determination of stable carbon isotopes of organic acids and carbonaceous aerosols in the atmosphere. Rapid Commun Mass Spectrom. 2006;20(15):2343-7.

Fukusaki, et al. Introduction of the archaebacterial geranylgeranyl pyrophosphate synthase gene into Chlamydomonas reinhardtii chloroplast. J Biosci Bioeng. 2003;95(3):283-7.

Gleason, et al. Stable isotope compositions of gases and vegetation near naturally burning coal. Nature. 1984; 307:254-257.

Goldschmidt-Clermont, M. Transgenic expression of aminoglycoside adenine transferase in the chloroplast: a selectable marker of site-directed transformation of chlamydomonas. Nucleic Acids Res. Aug. 11, 1991;19(15):4083-9.

Hallmann, A. Algal Transgenics and Biotechnology. Transgenic Plant Journal. 2007;1:81-98.

Halpin, et al. Self-processing 2A-polyproteins—a system for coordinate expression of multiple proteins in transgenic plants. The Plant Jurnal. 1999; 17(4):453-459.

Harris, et al. Chloroplast ribosomes and protein synthesis. Microbiol Rev. Dec. 1994;58(4):700-54.

Heifetz, P.B. Genetic engineering of the chloroplast. Biochimie. Jun.-Jul. 2000;82(6-7):655-66.

Ishikura, et al. Expression of a foreign gene in Chlamydomonas reinhardtii chloroplast. J Biosci Bioeng. 1999;87(3):307-14.

Kindle, et al. Engineering the chloroplast genome: techniques and capabilities for chloroplast transformation in Chlamydomonas reinhardtii. Proc Natl Acad Sci U S A. Mar. 1, 1991;88(5):1721-1725.

Kota, et al. Overexpression of the *Bacillus thuringiensis* (Bt) Cry2Aa2 protein in chloroplasts confers resistance to plants against susceptible and Bt-resistant insects. Proc Natl Acad Sci U S A. Mar. 2, 1999;96(5):1840-1845.

Kung, et al. Chloroplast promoters from higher plants. Nucleic Acids Res. Nov. 11, 1985;13(21):7543-9.

Mayfield, et al. Expression and assembly of a fully active antibody in algae. Jan. 21, 2003;100(2):438-442.

McBride, et al. Controlled expression of plastid transgenes in plants based on a nuclear DNA-encoded and plastid-targeted T7 RNA polymerase. Proc Natl Acad Sci U S A. Jul. 19, 1994;91(15):7301-5.

Minko, et al. Renilla luciferase as a vital reporter for chloroplast gene expression in Chlamydomonas. Mol Gen Genet. Oct. 1999;262(3):421-5.

O'Leary, M. H. Carbon isotopes in photosynthesis. BioScience. 1988; 38(5):328-336.

Pulz, et al. Valuable products from biotechnology of microalgae. Appl Microbiol Biotechnol. Nov. 2004;65(6):635-48.

Raven, et al. Inorganic C-sources for Lemanea, Cladophora and Ranunculus in a fast-flowing stream: Measurements of gas exchange and of carbon isotope ratio and their ecological implications. Oecologia. 1982; 53:68-78.

Rochaix, et al. Construction and characterization of autonomously replicating' plasmids in the green unicellular alga Chlamydomonas reinhardii. Cell. Apr. 1984;36(4):925-31.

Rochaix, et al. Strategy, progress and prospects of transformation in Chlamydomonas reinhardii. NATO advanced science institutes series : Series A : Life sciences (USA). 1985; Serial No. v. 83 p. 579-592.

(56) References Cited

OTHER PUBLICATIONS

Sakamoto, et al. In vivo analysis of Chlamydomonas chloroplast petD gene expression using stable transformation of beta-glucuronidase translational fusions. Proc Natl Acad Sci U S A. Jan. 15, 1993;90(2):497-501.

Schnitzler, et al. Contribution of different carbon sources to isoprene biosynthesis in poplar leaves. Plant Physiol. May 2004;135(1):152-60.

Sharkey, et al. Isoprene emission from plants: why and how. Ann Bot (Lond). Jan. 2008;101(1):5-18.

Sheehan, et al. A look back at the U.S. Department of Energy's aquatic species program: Biodiesel from algae. The National Laboratory of the U.S. Department of Energy. Jul. 1998. (328 pages).

Sidorov, et al. Technical Advance: Stable chloroplast transformation in potato: use of green fluorescent protein as a plastid marker. Plant J. Jul. 1999;19(2):209-216.

Staub, et al. Accumulation of D1 polypeptide in tobacco plastids is regulated via the untranslated region of the psbA mRNA. Embo J. Feb. 1993;12(2):601-6.

Staub, et al. High-yield production of a human therapeutic protein in tobacco chloroplasts. Nat Biotechnol. Mar. 2000;18(3):333-8.

Svab, et al. High-frequency plastid transformation in tobacco by selection for a chimeric aadA gene. Proc Natl Acad Sci U S A. Feb. 1, 1993;90(3):913-7.

Svab, et al. Stable transformation of plastids in higher plants. Proc Natl Acad Sci U S A. Nov. 1990;87(21):8526-8530.

Yuji, I. Biological C O2 Fixation and Utilization by Micro-algal Photosynthesis. Available at http://biozine.kribb.re.kr/bodo/bodo_view.html?code=vision&num=176&GotoPage=23&sname=&sval. Accessed Sep. 19, 2007.

Zerges, et al. The 5' leader of a chloroplast mRNA mediates the translational requirements for two nucleus-encoded functions in Chlamydomonas reinhardtii. Mol Cell Biol. Aug. 1994;14(8):5268-77.

Boynton, et al. Chloroplast transformation in Chlamydomonas with high velocity microprojectiles. Science. 1988; 240:1534-1538.

Coleman et al., "Isotopic identification of leakage gas from underground storage reservoirs—a progress report." Illinois Petroleum 111, 1977, pp. 1-10.

METHODS OF PRODUCING ORGANIC PRODUCTS WITH PHOTOSYNTHETIC ORGANISMS

CROSS-REFERENCE

This application claims the benefit of U.S. Provisional Application Nos. 60/971,418, 60/971,412 (both filed Sep. 11, 2007), 60/973,924 (filed Sep. 20, 2007), and 61/130,892 (filed Jun. 2, 2008), which applications are incorporated herein by reference.

BACKGROUND OF THE INVENTION

Fuel products, such as oil, petrochemicals, and other substances useful for the production of petrochemicals are increasingly in demand. Much of today's fuel products are generated from fossil fuels, which are not considered renewable energy sources, as they are the result of organic material being covered by successive layers of sediment over the course of millions of years. There is also a growing desire to lessen dependence on imported crude oil. Public awareness regarding pollution and environmental hazards has also increased. As a result, there has been a growing interest and need for alternative methods to produce fuel products as well as other products such as plastics, insecticides and fragrances. Thus, there exists a pressing need for alternative methods to develop products that are renewable, sustainable, and less harmful to the environment.

INCORPORATION BY REFERENCE

All publications and patent applications mentioned in this specification are herein incorporated by reference to the same extent as if each individual publication or patent application was specifically and individually indicated to be incorporated by reference.

SUMMARY OF THE INVENTION

Disclosed herein is a composition comprising: molecules comprising hydrogen and carbon atoms, wherein the hydrogen and carbon atoms are at least 80% of the weight of the composition, and wherein the $\delta^{13}C$ distribution of the composition is less than −32‰. In some instances, the composition further comprises an isoprene unit. For some compositions described herein, the hydrogen and carbon atoms are at least 90% of the weight of the composition. In still other compositions, the hydrogen and carbon atoms are at least 95% or 99% of the weight of the composition. In yet other compositions, the hydrogen and carbon atoms are 100% of the weight of the composition. In some instances, the composition is a liquid. In other instances, the composition is a fuel additive or a fuel product. In some embodiments, the composition is terpene. In other embodiments, the composition is not a fatty acid or a fatty acid ester. In some embodiments, the $\delta^{13}C$ distribution of the composition is less than −35‰, or less than −40‰. In other instances, the composition has an octane number of 85-120. In still other instances, the composition has an octane number of greater than 90.

Also described herein is a fuel product comprising a composition comprising molecules comprising hydrogen and carbon atoms, wherein the hydrogen and carbon atoms are at least 80% of the weight of the composition, and wherein the $\delta^{13}C$ distribution of the composition is less than −32‰ and a fuel component. In some instances, the fuel component is a blending fuel which may be fossil fuel, a mixture for fuel blending, gasoline, diesel, ethanol, jet fuel, or any combination thereof. In still other instances, the blending fuel has a $\delta^{13}C$ distribution of greater than −32‰. For some fuel products described herein, the fuel component is a fuel additive which may be MTBE, an anti-oxidant, an antistatic agent, a corrosion inhibitor, and any combination thereof. In some instances, the composition component further comprises an isoprene unit. In another instance, the hydrogen and carbon atoms are at least 90% of the weight of the composition component. In still other instances, the hydrogen and carbon atoms are at least 95 or 99% of the weight of the composition component. In yet other instances, the hydrogen and carbon atoms are 100% of the weight of the composition component. For some fuel products, the composition component is terpene. In some instances, the composition component is a liquid. In other instances the composition is not a fatty acid or a fatty acid ester. In another instance, the composition is not methane.

The present disclosure further provides a method of generating carbon dioxide comprising combusting a composition thereby generating carbon dioxide, wherein the carbon dioxide has a $\delta^{13}C$ distribution of less than −32‰. In some instances, the carbon dioxide has a $\delta^{13}C$ distribution of less than −35‰. In other instances, the carbon dioxide has a $\delta^{13}C$ distribution of less than −40‰. The combusting step may be carried out in a gasoline engine, in a diesel engine, or in a jet engine. In some embodiments, the method further comprises extracting the composition from a non-vascular photosynthetic organism. The disclosed methods may further comprise the step of upregulating an enzyme in the organism wherein a product of the enzyme is the composition. In some instances, the enzyme does not naturally occur in the organism.

An additional method provided herein is a method of labeling a composition comprising: obtaining a measurement of a $\delta^{13}C$ distribution of the composition; and labeling the composition using the measurement. In some embodiments, the labeling comprises denoting the $\delta^{13}C$ distribution of the composition and the measurement of the $\delta^{13}C$ distribution of the composition is less than −32‰. In an instance the composition is a fuel product that can comprise a fuel component.

In some aspects, a method described herein may further comprise the step of tracking the composition. In some instances, the tracking comprises: 1) comparing a carbon isotope distribution of an unknown composition to the measurement; 2) identifying the location of the composition, and/or; 3) monitoring the composition with a computer system.

The present disclosure also provides a method of generating a fuel product from a non-vascular photosynthetic organism comprising: growing a non-vascular photosynthetic organism, wherein the organism generates a first fuel product; contacting said organism with a source of inorganic carbons; and incorporating carbons from the source of inorganic carbons into the first fuel product, wherein the first fuel product has a $\delta^{13}C$ distribution of less than −32‰. In some instances, the source of inorganic carbons comprises carbon dioxide comprising $^{13}C$ and carbon dioxide comprising $^{12}C$. In some instances, contacting the organism with a source of inorganic carbons comprises contacting the organism with an excess source of inorganic carbons. In some embodiments, the organism comprises one or more nucleic acids encoding one or more enzymes whose end product is the first fuel product. In other embodiments, the nucleic acids are heterologous. A first fuel product may not be naturally produced by the organism. In some instances, the first fuel product has a $\delta^{13}C$ distribution of less than −32‰. In other instances, the first fuel product comprises a terpene. Fossil fuel inorganic carbons may have a $\delta^{13}C$ distribution of greater than −32‰. In some embodiments, a first fuel product is extracted from the organism. A first fuel product may be subjected to cracking. In some instances, the methods herein further comprise adding a fuel component to the first fuel product. In some instances, these methods further comprise combusting the first fuel product and generating $\delta^{13}C$ enriched inorganic carbons. In some instances, the $\delta^{13}C$ enriched inorganic carbons have a $\delta^{13}C$ distribution of less than −32‰.

Also provided herein is a business method of selling carbon credits comprising: obtaining a measurement of a $\delta^{13}C$ distribution of a composition; and comparing the $\delta^{13}C$ distribution of the composition to a reference $\delta^{13}C$ distribution; selling carbon credits to an entity if the $\delta^{13}C$ distribution of the composition is less than the reference $\delta^{13}C$ distribution, wherein the entity is an owner or user of the composition. In some instances, the reference $\delta^{13}C$ distribution is about −32‰. The method may further comprise labeling the composition using the measurement. The method may further comprise tracking the composition.

A method of generating a fuel product as disclosed herein comprises: growing a non-vascular photosynthetic organism; contacting said organism with flue gas; incorporating carbon from said flue gas into a fuel product; and extracting said fuel product from the non-vascular photosynthetic organism. In some instances, the method further comprises the step of genetically modifying the organism. In other instances, the fuel product does not naturally occur in the organism. A fuel product may comprise molecules comprising hydrogen and carbon atoms, wherein the hydrogen and carbon atoms are at least 90% of the weight of the product, and wherein the $\delta^{13}C$ distribution of the composition is less than −32‰. In some instances, a method includes the step of refining the fuel product. In an instance, the refining comprises at least one of the processes selected from the group consisting of the following: hydrocracking, catalytic cracking, steam cracking, cracking, fractionating, distilling, hydrotreating, and any combination thereof.

BRIEF DESCRIPTION OF THE FIGURES

Many novel features of the invention are set forth with particularity in the appended claims. A better understanding of exemplary features and advantages of the invention will be obtained by reference to the following detailed description that sets forth illustrative embodiments, in which many principles of the invention are utilized, and the accompanying drawings of which:

DETAILED DESCRIPTION OF THE INVENTION

Figure 1:
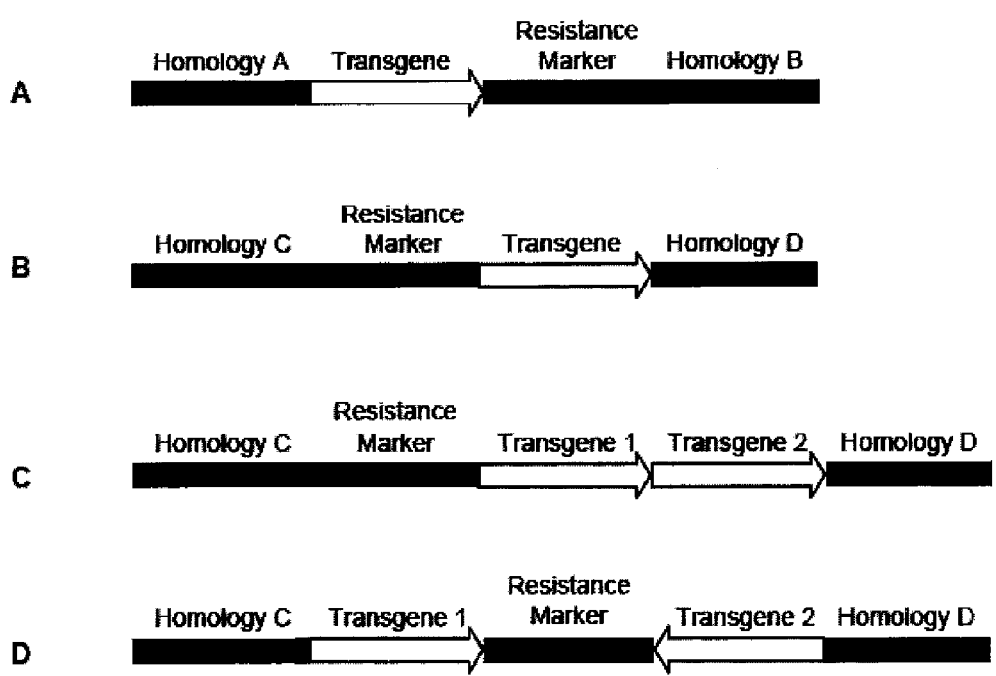
FIG. 1 is a graphic representation of nucleic acid constructs.

I. Products.

Disclosed herein are compositions and methods relating to creating products using photosynthetic organisms. Examples of products include, but are not limited to, fuel products, fragrance products, and insecticide products. A product can be any substance that releases molecularly stored energy. In an embodiment, a product is organic molecules. In another embodiment, a product is a hydrocarbon. In some instances a product does not include hydrogen. In some instances a product does not include oxygen. In some instances, a product does not include antibodies or proteins. In some instances a product does not include fatty acids.

Examples of fuel products include petrochemical products and their precursors and all other substances that may be useful in the petrochemical industry. Fuel products include, for example, petroleum products, and precursors of petroleum, as well as petrochemicals and precursors thereof. The fuel product may be used for generating substances, or materials, useful in the petrochemical industry, including petroleum products and petrochemicals. The fuel or fuel products may be used in a combustor such as a boiler, kiln, dryer or furnace. Other examples of combustors are internal combustion engines such as vehicle engines or generators, including gasoline engines, diesel engines, jet engines, and others. Fuel products may also be used to produce plastics, resins, fibers, elastomers, lubricants, and gels.

Examples of products contemplated herein include hydrocarbon products and hydrocarbon derivative products. A hydrocarbon product is one that consists of only hydrogen molecules and carbon molecules. A hydrocarbon derivative product is a hydrocarbon product with one or more heteroatoms, wherein the heteroatom is any atom that is not hydrogen or carbon. Examples of heteroatoms include, but are not limited to, nitrogen, oxygen, sulfur, and phosphorus. Some products are hydrocarbon-rich, wherein at least 50%, 60%, 70%, 80%, 90%, 95, 99% of the product by weight is made up carbon and hydrogen. In an embodiment, a product is 100% by weight carbon and hydrogen atoms. In some embodiments, the products comprise terpenes. In other embodiments, the products comprise fatty acids or fatty acid methyl esters.

Fuel products, such as hydrocarbons, may be precursors or products conventionally derived from crude oil, or petroleum, such as, but not limited to, liquid petroleum gas, naptha (ligroin), gasoline, kerosene, diesel, lubricating oil, heavy gas, coke, asphalt, tar, and waxes. For example, fuel products may include small alkanes (for example, 1 to approximately 4 carbons) such as methane, ethane, propane, or butane, which may be used for heating (such as in cooking) or making plastics. Fuel products may also include molecules with a carbon backbone of approximately 5 to approximately 9 carbon atoms, such as naptha or ligroin, or their precursors. Other fuel products may be about 5 to about 12 carbon atoms or cycloalkanes used as gasoline or motor filet. Molecules and aromatics of approximately 10 to approximately 18 carbons, such as kerosene, or its precursors, may also be fuel products. Fuel products may also include molecules, or their precursors, with more than 12 carbons, such as used for lubricating oil. Other fuel products include heavy gas or fuel oil, or their precursors, typically containing alkanes, cycloalkanes, and aromatics of approximately 20 to approximately 70 carbons. Fuel products also includes other residuals from crude oil, such as coke, asphalt, tar, and waxes, generally containing multiple rings with about 70 or more carbons, and their precursors.

The various fuel products may be further refined to a final product for an end user by a number of processes. Refining can occur by fractional distillation. For example, a mixture of fuel products, such as a mix of different hydrocarbons with different various chain lengths may be separated into various components by fractional distillation.

Refining may also include any one or more of the following steps; cracking, unifying, or altering the fuel product. Large fuel products, such as large hydrocarbons (for example ≥C10), may be broken down into smaller fragments by cracking. Cracking may be performed by heat or high pressure, such as by steam, visbreaking, or coking. Fuel products may also be refined by visbreaking, for example reducing the viscosity of heavy oils. Refining may also include coking, wherein a heavy, almost pure carbon residue is produced. Cracking may also be performed by catalytic means to enhance the rate of the cracking reaction by using catalysts such as, but not limited to, zeolite, aluminum hydrosilicate, bauxite, or silica-alumina. Catalysis may be by fluid catalytic cracking, whereby a hot catalyst, such as zeolite, is used to catalyze cracking reactions. Catalysis may also be performed by hydrocracking, where lower temperatures are generally used in comparison to fluid catalytic cracking. Hydrocracking typically occurs in the presence of elevated partial pressure of hydrogen gas. Fuel products may be refined by catalytic cracking to generate diesel, gasoline, and/or kerosene. Refining can also comprise hydrotreatment.

The fuel products may also be refined by combining them in a unification step, for example by using catalysts, such as platinum or a platinum-rhenium mix. The unification process typically produces hydrogen gas, a by-product which may be used in cracking.

The fuel products may also be refined by altering or rearranging or restructuring hydrocarbons into smaller molecules. There are a number of chemical reactions that occur in the catalytic reforming process of which are known to one of ordinary skill in the arts. Generally, catalytic reforming is performed in the presence of a catalyst and high partial pressure of hydrogen. One common process is alkylation. For example, propylene and butylene are mixed with a catalyst such as hydrofluoric acid or sulfinuric acid.

The fuel products may also be blended or combined into mixtures to obtain an end product. For example, the fuel products may be blended to form gasoline of various grades, gasoline with or without additives, lubricating oils of various weights and grades, kerosene of various grades, jet fuel, diesel fuel, heating oil, and chemicals for making plastics and other polymers. Compositions of the fuel products described herein may be combined or blended with fuel products produced by other means.

Disclosed herein is a composition comprising: molecules comprising hydrogen and carbon atoms, wherein the hydrogen and carbon atoms are at least 80% of the weight of the composition, and wherein the $\delta^{13}C$ distribution of the composition is less than −32‰. In some instances, the composition further comprises an isoprene unit. In some instance the composition comprises a terpene. In some instances, the composition further comprises triglycerides or fatty acids. For some compositions described herein, the hydrogen and carbon atoms are at least 90% of the weight of the composition. For example, a biodiesel or fatty acid methyl ester (which have less than 90% hydrogen and carbon atoms by weight) may not be part of the composition. In still other compositions, the hydrogen and carbon atoms are at least 95 or 99% of the weight of the composition. In yet other compositions, the hydrogen and carbon atoms are 100% of the weight of the composition. In some instances, the composition is a liquid. In other instances, the composition is a fuel additive or a fuel product. In some embodiments, the composition is terpene. In other embodiments, the composition is not a fatty acid or a fatty acid ester. In another embodiment, the composition is not methane. In some embodiments, the $\delta^{13}C$ distribution of the composition is less than −35‰, or less than −40‰, −45‰, −50‰, −55‰, or −60‰. In other instances, the composition has an octane number of about 85-120. In still other instances, the composition has an octane number of greater than 90.

Carbon fixation is a process of autotrophs, for example organisms driven by photosynthesis, whereby inorganic carbon is converted into organic materials. The Calvin Cycle is the most common method of carbon fixation. Carbon fixation in higher plants includes some types of carbon fixation during photosynthesis. C3 fixation is a process from a plant that uses the Calvin Cycle for the initial steps that incorporate inorganic carbon into organic matter, forming a 3-carbon compound as the first stable intermediate. Most broadleaf plants and plants in the temperate zones are C3. C4 fixation comprises a plant that prefaces the Calvin Cycle with reactions that incorporate inorganic carbon into 4-carbon compound. C4 plants can have a distinctive leaf anatomy, A C4 pathway can be found in hot regions with intense sunlight. Tropical grasses, such as sugar cane and maize, are C4 plants, but there are many broadleaf plants that are C4. Some plants use Crassulacean acid metabolism (CAM) as an adaptation for and conditions. Carbon dioxide entering the stomata during the night is converted into organic acids, which release carbon dioxide for the Calvin Cycle during the day, when the stomata are closed. The jade plant and some cactus species are examples of CAM plants.

In addition to the Calvin cycle, some other alternative pathways are currently known to be utilized by some autotrophic microorganisms to fix carbon. A reverse Krebs cycle can be described as the citric acid cycle run in reverse and, for example, is used by some photolithoautotrophic eubacteria and some chemolithoautotrophic sulfate-reducing bacteria. Reductive acetyl CoA Pathway is found in methanogenic archaebacteria and in acetogenic and some sulfate-reducing eubacteria as a way of fixing carbon. 3-Hydroxypropionate Pathway is found in photolithoautotrophically grown eubacteria of the genus *Chloroflexus* and in modified form in some chemolithoautotrophically grown archaebacteria as a way of fixing carbon.

In some instances, a product (such as a fuel product) contemplated herein comprises one or more carbons derived from an inorganic carbon source. In an embodiment, at least 10%, 20%, 30%, 40%, 50%, 60%, 70%, 80%, 90%, 95%, or 99% of the carbons of a product as described herein are derived from an inorganic carbon source. Examples of inorganic carbon sources include, but are not limited to, carbon dioxide, carbonate, bicarbonate, and carbonic acid. The product can be an organic molecule with carbons from an inorganic carbon source that were fixed during photosynthesis.

A product herein can be described by its Carbon Isotope Distribution (CID). At the molecular level, CID is the statistical likelihood of a single carbon atom within a molecule to be one of the naturally occurring carbon isotopes (for example, $^{12}C$, $^{13}C$, or $^{14}C$). At the bulk level of a product, CID may be the relative abundance of naturally occurring carbon isotopes (for example, $^{12}C$, $^{13}C$, or $^{14}C$) in a compound containing at least one carbon atom. While it is noted that CID of each fossil fuel may differ based on its source, CID(fos) (for example, CID of carbon in a fossil fuel, for example, petroleum, natural gas, and coal) is distinguishable from CID(atm) (for example, the CID of carbon in current atmospheric carbon dioxide). Additionally, CID(photo-atm) refers to the CID of a carbon-based compound made by photosynthesis in recent history where the source of inorganic carbon was carbon dioxide in the atmosphere. CID(photo-fos) refers to the CID of a carbon based compound made by photosynthesis in recent history where the source of substantially all of the inorganic carbon was carbon dioxide produced by the burning of fossil fuels (for example, coal, natural gas, and/or petroleum).

The exact distribution is also a characteristic of 1) the type of photosynthetic organism that produced the molecule and 2) the source of inorganic carbon. These isotope distributions can be used to define the composition of photosynthetically-derived fuel products.

Carbon isotopes are unevenly distributed among and within different compounds and the isotopic distribution can reveal information about the physical, chemical, and metabolic processes involved in carbon transformations. The overall abundance of $^{13}C$ relative to $^{12}C$ in photosynthetic organism tissue is commonly less than in the carbon of atmospheric carbon dioxide, indicating that carbon isotope discrimination occurs in the incorporation of carbon dioxide into photosynthetic biomass.

Atmospheric carbon dioxide contains approximately 1.1% of the nonradioactive isotope $^{13}C$ and 98.9% of $^{12}C$. During photosynthesis, plants discriminate against $^{13}C$ because of small differences in chemical and physical properties imparted by the difference in mass. In some cases, this discrimination can be used to assign plants to various photosynthetic groups. In an embodiment herein, the discrimination is used to identify the source of a hydrocarbon extracted from a photosynthetic organism.

The $^{13}C$ content of carbon dioxide can be determined with a mass spectrometer specially designed for high precision measurement of the ratio R, defined by:

$$R = \frac{^{13}C}{^{12}C}$$

In some instances, products, photosynthetic organisms, or other materials can be converted to carbon dioxide prior to analysis, for example, by combustion. In another example, individual compounds extracted from photosynthetic organisms are converted to carbon dioxide by chemical or enzymatic degradation. In many natural materials (for example, plants, animals, and minerals), R is approximately 0.0112, and with small variance or deviation.

$R_{sample}$ values can be converted to values of $\delta^{13}C$, wherein:

$$\delta^{13}C = \left[\frac{R_{sample}}{R_{standard}}\right] - 1 \times 1000$$

wherein $R_{standard}$ is the standard is carbon dioxide obtained from a limestone, known as PDB, from the Pee Dee formation in South Carolina for which R=0.01124. As disclose herein, all compositions that are denoted δ are with respect to PDB.

The units of $\delta^{13}C$ are per mil (also referred to herein as ‰). A more negative $\delta^{13}C$ indicates a composition with more $^{12}C$ (for example, lighter in mass), and a more positive $\delta^{13}C$ indicates a composition with more $^{13}C$ (for example, heavier in mass). Most natural materials have negative $\delta^{13}C$ values because they contain less $^{13}C$ than the PDB standard.

Carbon isotope combinations measured in aquatic photosynthetic organisms can range between −11‰ and −39‰, potentially leading to the mistaken impression that both C3 and C4 photosynthetic pathways are present in aquatic plants. Models have been developed to explore the amount of carbon fixation in aquatic photosynthetic organisms. In an embodiment, a composition is extracted and purified from an aquatic photosynthetic organism. In an embodiment, a composition is generated from an aquatic photosynthetic organism, wherein the composition is extracted from the organism and purified and the fuel product has a $\delta^{13}C$ of less than −32‰.

Photosynthetic organisms contain less $^{13}C$ than the atmosphere because the physical and chemical processes involved in carbon dioxide uptake discriminate against $^{13}C$. This discrimination occurs because $^{13}C$ is heavier than $^{12}C$ and can form slightly stronger chemical bonds. In addition, diffusion of $^{13}CO_2$ can be slower than that of $^{12}CO_2$ because of the difference in mass.

Aquatic photosynthetic organisms $\delta^{13}C$ values are more difficult to understand than those of terrestrial plants because of the importance of diffusion in photosynthesis of aquatic photosynthetic organisms. Diffusion of inorganic carbon dissolved in water is orders of magnitude slower than diffusion of inorganic carbon in air. For example, in aquatic photosynthetic organisms inorganic carbon diffusion can be limiting to isotope fractionation of the organism. Although the $\delta^{13}C$ value of carbon dioxide in air is relatively constant, the $\delta^{13}C$ value of dissolved carbon dioxide can be variable, and dissolved carbon dioxide differs from dissolved bicarbonate by approximately 9‰. Studies have shown that in rapidly flowing streams with mixing and a readily available inorganic carbon source neither mixing nor diffusion was rate limiting to isotope fractionation of aquatic photosynthetic organisms. However, in sluggish water, isotope fractionation has been shown to be small, indicating that inorganic carbon diffusion is limiting isotope fractionation.

The isotopic composition of the free atmosphere also changes, slowly becoming depleted in $^{13}C$. The progressive decrease $\delta^{13}C$ is caused by the anthropogenic burning of fossil fuels. From 1956 to 1982, $\delta^{13}C$ of carbon dioxide in the atmosphere has decreased from −6.7‰ (at 314 ppm) to −7.9‰ (at 342 ppm).

In normal, terrestrial photosynthesis, carbon compounds made by carbon fixation has a CID that is enriched in $^{12}C$ relative to the source of inorganic carbon. Moreover, CID (photo-fos) will have a higher percentage of $^{12}C$ than CID(photo-atm). The carbon in compounds made from photosynthesis using a fossil fuel source (which is already enriched for $^{12}C$ by an ancient round of photosynthesis), will be even further enriched for $^{12}C$ by an additional round of photosynthesis.

$^{14}C$ is a radioactive isotope of carbon that is created in the Earth's atmosphere. The half-life of $^{14}C$ is approximately 5,730 years. As a consequence CID(atm) has a much higher percentage of $^{14}C$ than CID(fos), since the inorganic carbon in fossil fuels has been sequestered for millions of years and virtually all the $^{14}C$ has decayed. In a similar way, CID (photo-atm) has a much higher percentage of $^{14}C$ than CID(photo-fos), reflecting the difference of $^{14}C$ in the sources of inorganic carbon. Therefore, CID(atm) has a higher percentage of $^{14}C$ than CID(fos).

Furthermore, as naturally occurring hydrocarbon molecules in fossil fuels are generally not olefins, the distribution of carbon stereo centers in petroleum derived hydrocarbon molecules are near racemic mixtures.

Thus, a product (for example, fuel product) can be a substantially pure or pure substance, that has at least 2 carbon atoms, at least one carbon-carbon bond, and a CID characteristic of a substance made photosynthetically, where the inorganic carbon source is a fossil fuel. In some instances, the substance can have at least one double bond and/or have a unique stereochemistry/be a non-racemic mixture.

The product can be one that is not naturally produced by a photosynthetic organism, such as a non-vascular, eukaryotic, photosynthetic organism. The product can also be one produced by a recombinant organism, such as a recombinant non-vascular, eukaryotic, photosynthetic organism.

In some instances, the product also includes hydrogen atoms, and optionally one or more heteroatoms such as oxygen, nitrogen, and/or sulfur atoms. The carbon atoms in the substance can have an isotope distribution (for example % of $^{12}C$, % of $^{13}C$, % of $^{14}C$) that is enriched for $^{12}C$, for example, levels consistent with the carbon isotope fractionation process that occurs when carbon atoms from inorganic sources (for example from carbon dioxide, carbonate, or carbonic acid) are fixed during photosynthesis (for example, of a nonvascular organism).

Thus, a product, such as a fuel product, can be synthesized directly from inorganic carbon sources (for example from carbon dioxide, carbonate, or carbonic acid), water, and electromagnetic radiation. The synthesis is performed by a genetically modified nonvascular photosynthetic organism. The modified organism contains one or more nucleic acids heterologous to the organism. The heterologous nucleic acids encode one or more enzymes whose end product is a product such as a fuel product. The fuel product is not naturally produced by the organism. The carbon atoms in the final product may be at least 50%, 90%, 99% or exclusively derived from inorganic carbon sources (for example carbon dioxide, carbonate, or carbonic acid) entering the cell. The synthesis of the fuel product is achieved by photosynthesis (for example light-driven carbon fixation).

During photosynthesis, carbon atoms from inorganic sources are fixed into organic carbon molecules. The chemical processes that perform fixation, such as the action of the RuBisCO enzyme in the Calvin-Benson Cycle, favors incorporation of certain isotopes. For example $^{12}C$ is preferentially fixed over $^{13}C$. Therefore, organic carbon molecules produced through photosynthesis are enriched in $^{12}C$. The distribution of isotopes caused by this fractionation process is characteristic of photosynthetically-derived molecules.

RuBisCO (Ribulose-1,5-bisphosphate carboxylase/oxygenase) is an enzyme in the Calvin cycle that catalyzes carbon fixation. Carbon fixation is a process by which the atoms of atmospheric carbon dioxide are made available to organisms in the form of energy-rich molecules such as sucrose. RuBisCO catalyzes either the carboxylation or oxygenation of ribulose-1,5-bisphosphate (RuBP) with carbon dioxide or oxygen.

RuBisCO may be the most abundant protein in the world. RuBisCO catalyzes a chemical reaction by which inorganic carbon enters the biosphere. RuBisCO is also the most abundant protein in leaves of higher plants. In an embodiment, an organism as described herein can be genetically modified to regulate the production of RuBisCO in the organism.

In plants, algae, cyanobacteria, and phototropic and chemoautotropic proteobacteria, RuBis Co usually consists of two types of protein subunit, called the large chain (about 55 kDa in size) and the small chain (about 13 kDa in size). The enzymatically active substrate RuBP binding sites are located in the large chains that form dimers in which amino acids from each large chain contribute to the binding sites. A total of eight large chain dimers and eight small chains assemble into a larger complex of about 540 kDa. In some proteobacteria and dinoflagellates, enzymes consisting of only large subunits can exist. Magnesium ions are needed for enzymatic activity. Correct positioning of magnesium ions in the active site of the enzyme involves addition of an activating carbon dioxide molecule to a lysine in the active site, thereby forming a carbamate. Formation of the carbamate is favored by an alkaline pH. The pH and the concentration of magnesium ions in a fluid compartment (for example, the stroma of the chloroplast) increases in the light. In an embodiment, magnesium ions can be added during growth of a photosynthetic organism.

During carbon fixation, the substrate molecules for RuBisCO are RuBP, substrate carbon dioxide (for example, different than activating carbon dioxide) and water. RuBisCO can also allow a reaction to occur with molecular oxygen instead of substrate carbon dioxide. In some instances the substrate carbon dioxide is carbon dioxide from flue gas.

When carbon dioxide is the substrate, the product of the carboxylase reaction is a highly unstable six-carbon phosphorylated intermediate known as 3-keto-2-carboxyarabinitol 1,5-bisphosphate, which decays virtually instantaneously into two molecules of glycerate 3-phosphate. The 3-phosphoglycerate can be used to produce larger molecules such as glucose. When molecular oxygen is the substrate, the products of the oxygenase reaction are phosphoglycolate and 3-phosphoglycerate. Phosphoglycolate initiates a sequence of reactions called photorespiration which involves enzymes and cytochromes located in the mitochondria and peroxisomes. In this process, two molecules of phosphoglycolate are converted to one molecule of carbon dioxide and one molecule of 3-phosphoglycerate, which can reenter the Calvin Cycle. Some of the phosphoglycolate entering this pathway can be retained by plants to produce other molecules such as glycine. At air levels of carbon dioxide and oxygen, the ratio of the reactions is about 4 to 1, which results in a net carbon dioxide fixation of only 3.5. Thus the inability of the enzyme to prevent the reaction with oxygen greatly reduces the photosynthetic potential of many plants. Some plants, many algae and photosynthetic bacteria have overcome this limitation by devising means to increase the concentration of carbon dioxide around the enzyme, including C4 carbon fixation, crassulacean acid metabolism and using pyrenoid.

In an embodiment, a photosynthetic organism is genetically modified to produce or upregulate the production of an enzyme in the RuBisCO pathway or RuBisCO itself. For example, the organism can then produce organic products, such as a fuel product as described herein, with a lower $\delta^{13}C$ distribution.

Some enzymes can carry out thousands of chemical reactions each second. However, RuBisCO is slow, being able to fix only about 3 inorganic carbon molecules each second. Nevertheless, because of large concentration of RuBisCO in photosynthetic organisms, under most conditions, and when light is not otherwise limiting photosynthesis, the reaction of RuBisCO responds positively to increasing carbon dioxide concentration, therefore the concentration of inorganic carbons is limiting. The ultimate rate-limiting factor of the Calvin Cycle is RuBisCO that cannot be ameliorated in short time by any other factor. In an embodiment, inorganic carbons are provided to a photosynthetic organism at a concentration high enough that the concentration is not limiting and carbon fixation by RuBisCO can proceed.

In some instances, RuBisCO is usually active during the day because RuBP is not being produced in the dark, due to the regulation of several other enzymes in the Calvin Cycle. In addition, the activity of RuBisCO is coordinated with that of the other enzymes of the Calvin Cycle in several ways. Upon illumination of the chloroplasts, the pH of the stroma rises from 7.0 to 8.0 because of the proton gradient created across the thylakoid membrane. At the same time, magnesium ions move out of the thylakoids, increasing the concentration of magnesium in the stroma of the chloroplasts. RuBisCO has a high optimal pH (can be >9.0, depending on the magnesium ion concentration) and thus becomes activated by the addition of carbon dioxide and magnesium to the active sites as described herein. In an embodiment, a fuel product can be produced by an organism grown only in light conditions. In another embodiment of a method herein, the pH of a growth medium of an organism can be adjusted.

In some instances, another enzyme, RuBisCO activase is required to allow the rapid formation of the carbamate in the active site of RuBisCO. Activase is required because the RuBP substrate can bind more strongly to the active sites lacking the carbamate and can slow down the activation process. In the light, RuBisCO activase promotes the release of the inhibitory, or in some views storage, RuBP from the catalytic sites. Activase is also required in some plants (for example tobacco and many beans) because in darkness, RuBisCO is inhibited by a competitive inhibitor synthesized by these plants, a substrate analog 2-Carboxy-D-arabitinol 1-phosphate (CA1P). CA1P binds tightly to the active site of carbamylated RuBisCO and inhibits catalytic activity. In the light, RuBisCO activase also promotes the release of CA1P from the catalytic sites. After the CA1P is released from RuBisCO, it is rapidly converted to a non-inhibitory form by a light-activated CA1P-phosphatase. Finally, once every several hundred reactions, the normal reactions with carbon dioxide or oxygen are not completed and other inhibitory substrate analogs are formed in the active site. Once again, RuBisCO activase can promote the release of these analogs from the catalytic sites and maintain the enzyme in a catalytically active form. The properties of activase can limit the photosynthetic potential of plants at high temperatures. CA1P has also been shown to keep RuBisCO in a conformation that is protected from proteolysis. In some embodiments, RuBisCO activase can be upregulated by a photosynthetic organism. For example, the organism can be genetically modified to generate more RuBisCO activase.

Since carbon dioxide and oxygen compete at the active site of RuBisCO, carbon fixation by RuBisCO can be enhanced by increasing the carbon dioxide level in the compartment containing RuBisCO (for example, the chloroplast stroma). In an embodiment, modification of a photosynthetic organism for producing a fuel product can increase the level of carbon dioxide in the stroma. When RuBisCO uses oxygen as a substrate, this process may be a mechanism for preventing overload during periods of high light flux. For example, photosynthetic organisms in bright light may have zero net carbon fixation when the ratio of oxygen to carbon dioxide reaches a threshold at which oxygen is fixed instead of carbon. In an embodiment, excess inorganic carbons can be provided to the photosynthetic organism, such that the light and temperature are not limiting to carbon fixation within the organism.

Since RuBisCO is often rate limiting for photosynthesis in plants, in an example herein, photosynthetic efficiency can be improved by modifying RuBisCO genes in a photosynthetic organism to increase its catalytic activity and/or decrease the rate of the oxygenation activity. In an embodiment, heterologous nucleic acids from one organism encoding RuBisCO are transformed into another photosynthetic organism. For example, modifying an organism to generate a fuel product with a $\delta^{13}C$ of less than −32‰ can comprise increasing the level of expression of RuBisCO subunits. In another instance, RuBisCO small chains can be expressed from the chloroplast DNA. In another embodiment, nucleic acids encoding RuBisCO may be modified or altered, for example to increase specificity for carbon dioxide or otherwise increase the rate of carbon fixation.

In an embodiment, RuBisCO variants with naturally high specificity values, for example without limitation from the red alga *Galdieria partita*, can be transformed into a photosynthetic organism for the production of a fuel product with a certain amount of carbon fixation. For example, by improving the specificity of RuBisCO or carbon fixation in an organism, it may be possible to improve photosynthetic efficiency or growth of a photosynthetic organism.

In an embodiment, an aquatic photosynthetic organism is contacted with a source of inorganic compounds, wherein the organism produces a fuel product. The source of inorganic carbons can be from a fossil fuel. For example, burning a fossil fuel can produce inorganic carbons that can be provided to the aquatic photosynthetic organism. The combustion of a fossil fuel can produce a flue gas. Flue gas is gas that exits to the atmosphere via a flue, for example a pipe or channel for conveying exhaust gases from a fireplace, oven, furnace, boiler or steam generator. In an embodiment, flue gas refers to the combustion exhaust gas produced at power plants. The composition of flue gas depends on what is being burned, but can consist of mostly nitrogen (typically more than two-thirds) derived from the combustion air, carbon dioxide and water vapor as well as excess oxygen (also derived from the combustion air). For example, for each ton of oil or coal fuel burned at a power plant, the flue gas contains 3 to 3.5 tons of carbon dioxide. Flue gas can be an air pollutant.

In an embodiment, flue gas comprises carbon dioxide with a $\delta^{13}C$ greater than the $\delta^{13}C$ of atmospheric carbon dioxide. When an aquatic photosynthetic organism is contacted with flue gas (for example, by bubbling flue gas through a bioreactor or pond), organic carbons generated by the aquatic photosynthetic organism can have a $\delta^{13}C$ near that of the flue gas carbon dioxide. However, as described herein, the carbon fixation by an organism of an inorganic carbon source into an organic molecule can be limited by the diffusion of the inorganic carbon source into the organism. Diffusion limitation of carbon fixation in an organism can be pronounced in an aquatic species. For example, if only the inorganic source is limited or cannot diffuse at a fast enough rate into the organism, the organism may not fully preference $^{12}C$ over $^{13}C$ during carbon fixation. Algae, which take up carbon dioxide by means of RuBisCO, show isotope fractionations that vary with environmental carbon dioxide concentration (for example, Kerby and Raven 1985 Adv. Bot. Res. 11:71-123). In laboratory experiments, small isotope fractionations also known as Δ (sometimes approaching 0‰) are observed when carbon dioxide is limiting, and fractionations of 20‰ or more are observed when carbon dioxide concentration is high. In some studies, isotope fractionations may vary over this entire range, with most of the variation presumably being due to variations in carbon dioxide availability.

In an instance, an algae is grown in contact with atmospheric inorganic carbon source and produces a fuel product with a $\delta^{13}C$ of about −13‰. In another instance, an algae is grown in contact with a flue gas inorganic carbon source and produces a fuel product with a $\delta^{13}C$ of about −22‰. In yet another instance, algae is grown in contact with an excess flue gas inorganic carbon source, such that the diffusion is not limiting the carbon fixation of the inorganic carbons, and the algae produces a fuel product with a $\delta^{13}C$ of about −52‰. In an embodiment, any algae grown in contact with an excess fossil fuel inorganic carbon source produces a fuel product with a $\delta^{13}C$ of less than about −32‰. In some embodiments, an excess inorganic carbon source is a source that is not diffusion limiting of carbon fixation within a photosynthetic organism.

Also described herein is a fuel product comprising a composition comprising molecules comprising hydrogen and carbon atoms, wherein the hydrogen and carbon atoms are at least 80% of the weight of the composition, and wherein the $\delta^{13}C$ distribution of the composition is less than −32‰ and a fuel component. In some embodiments, the $\delta^{13}C$ distribution of the composition is less than about −35‰, −40‰, −45‰, −50‰, −55‰, or −60‰. In some instances, the fuel component is a blending fuel which may be fossil fuel, gasoline, diesel, ethanol, jet fuel, or any combination thereof. In still other instances, the blending fuel has a $\delta^{13}C$ distribution of greater than −32‰. For some fuel products described herein, the fuel component is a fuel additive which may be MTBE, an anti-oxidant, an antistatic agent, a corrosion inhibitor, and any combination thereof. In some instances, the composition component further comprises an isoprene unit. In another instance the composition comprises a terpene. In some instances the composition comprises triglycerides or fatty acids. In other instances, the hydrogen and carbon atoms are at least 90% of the weight of the composition component. For example, a fatty acid methyl ester fuel or biodiesel typically has a hydrogen and carbon content by weight of less than about 89.5%. In some instances the composition is not a fatty acid or a fatty acid ester or methane. In still other instances, the hydrogen and carbon atoms are at least 95 or 99% of the weight of the composition component. In yet other instances, the hydrogen and carbon atoms are 100% of the weight of the composition component. For some fuel products, the composition component is terpene. In some instances, the composition component is a liquid.

A fuel product as described herein may be a product generated by blending a composition and a fuel component. In some instances, the fuel product has a $\delta^{13}C$ distribution of greater than −32‰. In other instances, the fuel product has a $\delta^{13}C$ distribution of less than −32‰. For example, a composition extracted from an organism can be blended with a fuel component prior to refining (for example, cracking) in order to generate a fuel product as described herein. The composition can be a composition as described herein. The composition can be an oil composition extracted from the organism that comprises a composition wherein the hydrogen and carbon atoms are at least 80% of the weight of the composition, and wherein the $\delta^{13}C$ distribution of the composition is less than −32‰. A fuel component, as described, can be a fossil fuel, or a mixing blend for generating a fuel product. For example, a mixture for fuel blending may be a hydrocarbon mixture that is suitable for blending with another hydrocarbon mixture to generate a fuel product. For example, a mixture of light alkanes may not have a certain octane number to be suitable for a type of fuel, however, it can be blended with a high octane mixture to generate a fuel product.

In an example, a composition with a $\delta^{13}C$ distribution of less than −32‰ is blended with a hydrocarbon mixture for fuel blending to create a fuel product. In some instances, the composition or fuel component alone are not suitable as a fuel product, however, when combined, they comprise a fuel product. In other instances, either the composition or the fuel component or both individual are suitable as a fuel product. In yet other instances, the fuel component is an existing petroleum product, such as gasoline or jet fuel. In yet other instances, the fuel component is derived from a renewable resource, such as bioethanol, biodiesel, biogasoline, and the like.

The present disclosure further provides a method of generating carbon dioxide comprising combusting a composition thereby generating carbon dioxide, wherein the carbon dioxide has a $\delta^{13}C$ distribution of less than −32‰. In some instances, the carbon dioxide has a $\delta^{13}C$ distribution of less than about −35‰, −40‰, −45‰, −50‰, −55‰, or −60‰. The combusting step may be carried out in a gasoline engine, in a diesel engine, or in a jet engine. In some embodiments, the method further comprises extracting the composition from a non-vascular photosynthetic organism. Examples of non-vascular photosynthetic organisms include, but are not limited to, algae, cyanobacteria, and bryophytes. In an embodiment, extracting the composition comprises extracting the composition from an aquatic photosynthetic organism. The disclosed methods may further comprise the step of upregulating an enzyme in the organism wherein a product of the enzyme is the composition. In some instances, the enzyme does not naturally occur in the organism. Exemplary enzymes are discussed further herein. In another embodiment, exemplary nucleic acid sequences are discussed further herein.

A method of generating a fuel product is disclosed that comprises: growing a non-vascular photosynthetic organism; contacting said organism with flue gas; incorporating $^{13}C$ from said flue gas into a fuel product; and extracting said fuel product from the non-vascular photosynthetic organism. For example, the non-vascular photosynthetic organism can be grown in a bioreactor. In this exemplary embodiment, organism can be contacted with flue gas by infusing the bioreactor with flue gas (for example, bubbling flue gas into a bioreactor comprising liquid for growing a non-vascular photosynthetic organism). In some instances, the non-vascular photosynthetic organism is algae. In other instances the bioreactor is an open pond. In other instance the bioreactor is a closed photobioreactor. In some instances, the method further comprises the step of genetically modifying the organism. Exemplary methods of genetically modifying an organism are described herein. In some instances, genetically modifying the organism can upregulate or produce enzymes that generate fuel products within the organism. In other instance, genetically modifying the organism can improve the growth of the organism. In yet another instance, genetically modifying the organism affects the carbon fixation within the organism, for example altering the rate or quantity of carbon fixation. In some instances, the fuel product does not naturally occur in the organism. A fuel product may comprise molecules comprising hydrogen and carbon atoms, wherein the hydrogen and carbon atoms are at least 90% of the weight of the composition, and wherein the $\delta^{13}C$ distribution of the composition is less than −32‰. In some instances, a method includes the step of refining the fuel product. Exemplary refining methods are described herein.

The present disclosure also provides a method of generating a fuel product from a non-vascular photosynthetic organism comprising: growing a non-vascular photosynthetic organism, wherein the organism generates a first fuel product; contacting said organism with a source of inorganic carbons; and incorporating carbons from the source of inorganic carbons into the first fuel product, wherein the first fuel product has a $\delta^{13}C$ distribution of less than −32‰. In some instances, the source of inorganic carbons comprises carbon dioxide comprising $^{13}C$ and carbon dioxide comprising $^{12}C$. In some instances, the source of inorganic carbons are fossil fuel inorganic carbons. In other instances the inorganic carbons have a $\delta^{13}C$ distribution of greater than −32‰. In some instances, contacting the organism with a source of inorganic carbons comprises contacting the organism with an excess source of inorganic carbons. For example, excess inorganic carbons can describe a quantity of inorganic carbons such that carbon fixation within the organism in not limited by the source of inorganic carbons. In another example, excess inorganic carbons can described a quantity of inorganic carbons such that the $\delta^{13}C$ distribution of a fuel product generated by an organism in contact with the excess inorganic carbons is less than the $\delta^{13}C$ distribution of fossil fuel. For example, the $\delta^{13}C$ distribution of the fuel product with inorganic carbons incorporated from the excess source of inorganic carbons can be less than −32‰, −35‰, −40‰, −45‰, −50‰, −55‰, or −60‰.

In some embodiments, the organism comprises one or more nucleic acids encoding one or more enzymes whose end product is the first fuel product. In other embodiments, the nucleic acids are heterologous. A first fuel product may not be naturally produced by the organism. In some instances, the first fuel product has a $\delta^{13}C$ distribution of less than −32‰. In other instances, the first fuel product comprises a terpene. Fossil fuel inorganic carbons may have a $\delta^{13}C$ distribution of greater than −32‰. In some embodiments, a first fuel product is extracted from the organism. A first fuel product may be subjected to cracking. In some instances, the methods herein further comprise adding a fuel component to the first fuel product. In some instances, these methods further comprise combusting the first fuel product and generating $\delta^{13}C$ enriched inorganic carbons. In some instances, the $\delta^{13}C$ enriched inorganic carbons have a $\delta^{13}C$ distribution of less than −32‰. Methods disclosed herein may further comprise the steps of: culturing a second non-vascular photosynthetic organism, wherein the organism generates a second fuel product; contacting said organism with a source of inorganic carbons, such that the carbons in the second fuel product are derived from such source, wherein the inorganic carbons are the $\delta^{13}C$ enriched inorganic carbons. For example, the carbons in the second fuel product are incorporated carbons from the source of inorganic carbons. The method can include incorporating carbons from the source of inorganic carbons into the second fuel product. In some instances, the first fuel product and the second fuel product are substantially the same, except for a carbon isotope distribution of the first and second fuel products. The second fuel product may have a $\delta^{13}C$ distribution of less than −35‰, −40‰, −45‰, −50‰, −55‰, or −60‰.

Examples of hydrocarbon and hydrocarbon derivative products that can be produced using the compositions and methods herein include terpenes, and their derivatives, terpenoids. As used herein, terpene can be used interchangeably with isoprenoid or terpenoid. A terpene is a molecule made of isoprene (C5) units. A terpene is not necessarily a pure a hydrocarbon. Terpenoids (also known as isoprenoids) are derived from terpenes but are modified such as by the addition of heteroatoms such as oxygen, carbon skeleton rearrangement, and alkylation. As described, terpenoids can be encompassed by the term terpene as utilized herein. Carotenoids, such as carotenes and xanthophylls, are an example of a terpenoid as a useful product. A steroid is another example of a terpenoid.

Examples of terpenes include, but are not limited to, hemiterpenes, monoterpenes, sesquiterpenes, diterpenes, triterpenes, and tetraterpenes. The terms hemiterpenes, monoterpenes, sesquiterpenes, diterpenes, triterpenes, and tetraterpenes as used herein can also refer to isoprenoids of similar structures (for example, sesquiterpenoids). Other examples of terpenes include, but are not limited to, limonene, 1,8-cineole, α-pinene, camphene, (+)-sabinene, myrcene, squalene, cuparene, phytol, farnesene, abietadiene, taxadiene, farnesyl pyrophosphate, amorphadiene, (E)-α-bisabolene, or diapophytoene, and their derivatives.

The products produced may be naturally, or non-naturally (as a result of the transformation) produced by the host cell and organism(s) transformed. The product may also be a novel molecule not present in nature. For example, products naturally produced in algae may be terpenes such as carotenoids (for example beta-carotene). Examples of products not naturally produced by algae may include a non-native terpene such as limonene.

Some fuel products produced from the host cells, sometimes after refining, will be identical to existing petrochemicals, for example same structure. Some of the fuel products may not be the same as existing petrochemicals. In an embodiment, a fuel product or composition is identical to an existing petrochemical, except for the carbon isotope distribution. For example, it is believed no fossil fuel petrochemicals have a $\delta^{13}C$ distribution of less than −32‰, whereas fuel products as described herein can have a $\delta^{13}C$ distribution of less than −32‰, −35‰, −40‰, −45‰, −50‰, −55‰, or −60‰. In another embodiment, a fuel product or composition is similar but not the same as an existing fossil fuel petrochemical and has a $\delta^{13}C$ distribution of less than −32‰, −35‰, −40‰, −45‰, −50‰, −55‰, or −60‰. However, although a molecule may not exist in conventional petrochemicals or refining, it may still be useful in these industries. For example, a hydrocarbon can be produced that is in the boiling point range of gasoline, and that could be used as gasoline or an additive, even though the hydrocarbon does not normally occur in gasoline.

II. Production.

Any of the products described herein can be prepared by transforming an organism to cause the production by such organism of the product. The organism can be photosynthetic prior to or after transformation.

Organisms

Examples of organisms that can be transformed using the compositions and methods herein include vascular and non-vascular organisms. The organism can be prokaryotic or eukaryotic. The organism can be unicellular or multicellular.

Examples of non-vascular photosynthetic organisms include bryophtyes, such as marchantiophytes or anthocerotophytes. In some instances the organism is a cyanobacteria. In some instances, the organism is algae (for example, macroalgae or microalgae). The algae can be unicellular or multicellular algae. In some instances the organism is a rhodophyte, chlorophyte, heterokontophyte, tribophyte, glaucophyte, chlorarachniophyte, euglenoid, haptophyte, cryptomonad, dinoflagellum, or phytoplankton.

For example, the microalgae *Chlamydomonas reinhardtii* may be transformed with a vector encoding limonene synthase to produce limonene. In another embodiment, the microalgae may be transformed with one or more vectors encoding a limonene synthase and proteins to improve limonene production.

In some instances, the methods are exemplified using the microalga, *C. reinhardtii*. The use of microalgae to express a polypeptide or protein complex provides the advantage that large populations of the microalgae can be grown, including commercially (Cyanotech Corp.; Kailua-Kona HI), thus allowing for production and, if desired, isolation of large amounts of a desired product. However, the ability to express, for example, functional mammalian polypeptides, including protein complexes, in the chloroplasts of any plant allows for production of crops of such plants and, therefore, the ability to conveniently produce large amounts of the polypeptides. Accordingly, methods described herein can be practiced using any plant having chloroplasts, including, for example, macroalgae, for example, marine algae and seaweeds, as well as plants that grow in soil.

The term "plant" is used broadly herein to refer to a eukaryotic organism containing plastids, particularly chloroplasts, and includes any such organism at any stage of development, or to part of a plant, including a plant cutting, a plant cell, a plant cell culture, a plant organ, a plant seed, and a plantlet. A plant cell is the structural and physiological unit of the plant, comprising a protoplast and a cell wall. A plant cell can be in the form of an isolated single cell or a cultured cell, or can be part of higher organized unit, for example, a plant tissue, plant organ, or plant. Thus, a plant cell can be a protoplast, a gamete producing cell, or a cell or collection of cells that can regenerate into a whole plant. As such, a seed, which comprises multiple plant cells and is capable of regenerating into a whole plant, is considered plant cell for purposes of this disclosure. A plant tissue or plant organ can be a seed, protoplast, callus, or any other groups of plant cells that is organized into a structural or functional unit. Particularly useful parts of a plant include harvestable parts and parts useful for propagation of progeny plants. A harvestable part of a plant can be any useful part of a plant, for example, flowers, pollen, seedlings, tubers, leaves, stems, fruit, seeds, roots, and the like. A part of a plant useful for propagation includes, for example, seeds, fruits, cuttings, seedlings, tubers, rootstocks, and the like.

A method as provided herein can generate a plant containing chloroplasts that are genetically modified to contain a stably integrated polynucleotide (Hager and Bock, *Appl. Microbiol. Biotechnol.* 54:302-310, 2000). Accordingly, as described herein a method can further provide a transgenic (transplastomic) plant, for example *C. reinhardtii*, which comprises one or more chloroplasts containing a polynucleotide encoding one or more heterologous polypeptides, including polypeptides that can specifically associate to form a functional protein complex. A photosynthetic organism can comprise at least one host cell that is modified to generate a product.

Expression Vectors and Host Cell Transformation

The organisms/host cells herein can be transformed to modify the production of a product(s) with an expression vector, for example, to increase production of a product(s). The product(s) can be naturally or not naturally produced by the organism.

The expression vector can encode one or more homologous or heterologous nucleotide sequences (derived from the host organism or from a different organism) and/or one or more autologous nucleotide sequences (derived from the same organism) and/or those that encode homologous or heterologous polypeptides. Examples of heterologous nucleotide sequences that can be transformed into an algal host cell include genes from bacteria, fungi, plants, photosynthetic bacteria or other algae. Examples of autologous nucleotide sequences that can be transformed into an algal host cell include isoprenoid synthetic genes, endogenous promoters and 5' UTRs from the psbA, atpA, or rbcL genes. In some instances, a heterologous sequence is flanked by two autologous sequences or homologous sequences. Homologous sequences are those that have at least 50%, 60%, 70%, 80%, or 90% homology to the sequence in the host cell. In some instances, a homologous sequence is flanked by two autologous sequences. The first and second homologous sequences enable recombination of the heterologous sequence into the genome of the host organism. The first and second homologous sequences can be at least 100, 200, 300, 400, or 500 nucleotides in length.

The expression vector may comprise nucleotide sequences that are codon biased for expression in the organism being transformed. The skilled artisan will be aware of the "codon-bias" exhibited by a specific host cell in usage of nucleotide codons to specify a given amino acid. Without being bound by theory, by using a host cell's preferred codons, the rate of translation may be greater. Therefore, when synthesizing a gene for improved expression in a host cell, it may be desirable to design the gene such that its frequency of codon usage approaches the frequency of preferred codon usage of the host cell. The codons are generally A/T rich, for example, A/T rich in the third nucleotide position of the codons. Typically, the A/T rich codon bias is used for algae. In some embodiments, at least 50% of the third nucleotide position of the codons are A or T. In other embodiments, at least 60%, 70%, 80%, 90%, or 99% of the third nucleotide position of the codons are A or T.

One approach to construction of a genetically manipulated strain of alga involves transformation with a nucleic acid which encodes a gene of interest, typically an enzyme capable of converting a precursor into a fuel product or precursor of a fuel product. In some embodiments, a transformation may introduce nucleic acids into any plastid of the host alga cell (for example, chloroplast). Transformed cells are typically plated on selective media following introduction of exogenous nucleic acids. This method may also comprise several steps for screening. Initially, a screen of primary transformants is typically conducted to determine which clones have proper insertion of the exogenous nucleic acids. Clones which show the proper integration may be patched and re-screened to ensure genetic stability. Such methodology ensures that the transformants contain the genes of interest. In many instances, such screening is performed by polymerase chain reaction (PCR); however, any other appropriate technique known in the art may be utilized. Many different methods of PCR are known in the art (for example, nested PCR, real time PCR). Particular examples are utilized in the examples described herein; however, one of skill in the art will recognize that other PCR techniques may be substituted for the particular protocols described. Following screening for clones with proper integration of exogenous nucleic acids, typically clones are screened for the presence of the encoded protein. Protein expression screening typically is performed by Western blot analysis and/or enzyme activity assays.

A recombinant nucleic acid molecule useful in a method herein can be contained in a vector. Furthermore, where the method is performed using a second (or more) recombinant nucleic acid molecules, the second recombinant nucleic acid molecule also can be contained in a vector, which can, but need not, be the same vector as that containing the first recombinant nucleic acid molecule. The vector can be any vector useful for introducing a polynucleotide into a chloroplast and, preferably, includes a nucleotide sequence of chloroplast genomic DNA that is sufficient to undergo homologous recombination with chloroplast genomic DNA, for example, a nucleotide sequence comprising about 400 to 1500 or more substantially contiguous nucleotides of chloroplast genomic DNA. Chloroplast vectors and methods for selecting regions of a chloroplast genome for use as a vector are well known (see, for example, Bock, J. Mol. Biol.

312:425-438, 2001; see, also, Staub and Maliga, *Plant Cell* 4:39-45, 1992; Kavanagh et al., *Genetics* 152:1111-1122, 1999, each of which is incorporated herein by reference).

In some instances, such vectors include promoters. Promoters useful herein may come from any source (for example, viral, bacterial, fungal, protist, animal). The promoters contemplated herein can be specific to photosynthetic organisms, non-vascular photosynthetic organisms, and vascular photosynthetic organisms (for example, algae, flowering plants). As used herein, the term "non-vascular photosynthetic organism," refers to any macroscopic or microscopic organism, including, but not limited to, algae, cyanobacteria and photosynthetic bacteria, which does not have a vascular system such as that found in higher plants. In some instances, the nucleic acids above are inserted into a vector that comprises a promoter of a photosynthetic organism, for example, algae. The promoter can be a promoter for expression in a chloroplast and/or other plastid. In some instances, the nucleic acids are chloroplast based. Examples of promoters contemplated for insertion of any of the nucleic acids herein into the chloroplast include those disclosed in US Application No. 2004/0014174. The promoter can be a constitutive promoter or an inducible promoter. A promoter typically includes necessary nucleic acid sequences near the start site of transcription, (for example, a TATA element).

The entire chloroplast genome of *C. reinhardtii* is available to the public on the world wide web, at the URL "biology.duke.edu/chlamy_genome/-chloro.html" (see "view complete genome as text file" link and "maps of the chloroplast genome" link), each of which is incorporated herein by reference (J. Maul, J. W. Lilly, and D. B. Stern, unpublished results; revised Jan. 28, 2002; to be published as GenBank Acc. No. AF396929). Generally, the nucleotide sequence of the chloroplast genomic DNA is selected such that it is not a portion of a gene, including a regulatory sequence or coding sequence, particularly a gene that, if disrupted due to the homologous recombination event, would produce a deleterious effect with respect to the chloroplast, for example, for replication of the chloroplast genome, or to a plant cell containing the chloroplast. In this respect, the website containing the *C. reinhardtii* chloroplast genome sequence also provides maps showing coding and non-coding regions of the chloroplast genome, thus facilitating selection of a sequence useful for constructing a vector. For example, the chloroplast vector, p322, is a clone extending from the Eco (Eco RI) site at about position 143.1 kb to the Xho (Xho I) site at about position 148.5 kb (see, world wide web, at the URL "biology.duke.edu/chlamy_genome/chloro.html", and clicking on "maps of the chloroplast genome" link, and "140-150 kb" link; also accessible directly on world wide web at URL "biology.duke.edu/chlam-y/chloro/chloro140.html").

A vector utilized herein also can contain one or more additional nucleotide sequences that confer desirable characteristics on the vector, including, for example, sequences such as cloning sites that facilitate manipulation of the vector, regulatory elements that direct replication of the vector or transcription of nucleotide sequences contain therein, sequences that encode a selectable marker, and the like. As such, the vector can contain, for example, one or more cloning sites such as a multiple cloning site, which can, but need not, be positioned such that a heterologous polynucleotide can be inserted into the vector and operatively linked to a desired element. The vector also can contain a prokaryote origin of replication (ori), for example, an *E. coli* ori or a cosmid ori, thus allowing passage of the vector in a prokaryote host cell, as well as in a plant chloroplast, as desired.

A regulatory element, as the term is used herein, broadly refers to a nucleotide sequence that regulates the transcription or translation of a polynucleotide or the localization of a polypeptide to which it is operatively linked. Examples include, but are not limited to, an RBS, a promoter, enhancer, transcription terminator, an initiation (start) codon, a splicing signal for intron excision and maintenance of a correct reading frame, a STOP codon, an amber or ochre codon, an IRES. Additionally, a cell compartmentalization signal (for example, a sequence that targets a polypeptide to the cytosol, nucleus, chloroplast membrane or cell membrane). Such signals are well known in the art and have been widely reported (see, for example, U.S. Pat. No. 5,776,689).

Any of the expression vectors herein can further comprise a regulatory control sequence. A regulatory control sequence may include for example, promoter(s), operator(s), repressor(s), enhancer(s), transcription termination sequence(s), sequencers) that regulate translation, or other regulatory control sequence(s) that are compatible with the host cell and control the expression of the nucleic acid molecules. In some cases, a regulatory control sequence includes transcription control sequence(s) that are able to control, modulate, or effect the initiation, elongation, and/or termination of transcription. For example, a regulatory control sequence can increase transcription and translation rate and/or efficiency of a gene or gene product in an organism, wherein expression of the gene or gene product is upregulated resulting (directly or indirectly) in the increased production of a product described herein. The regulatory control sequence may also result in the increase of production of a product by increasing the stability of a gene or gene product.

A regulatory control sequence can be autologous or heterologous, and if heterologous, may be homologous. The regulatory control sequence may encode one or more polypeptides which are enzymes that promote expression and production of products. For example, a heterologous regulatory control sequence may be derived from another species of the same genus of the organism (for example, another algal species) and encode a synthase in an algae. In another example, an autologous regulatory control sequence can be derived from an organism in which an expression vector is to be expressed.

Depending on the application, regulatory control sequences can be used that effect inducible or constitutive expression. The algal regulatory control sequences can be used, and can be of nuclear, viral, extrachromosomal, mitochondrial, or chloroplastic origin.

Suitable regulatory control sequences include those naturally associated with the nucleotide sequence to be expressed (for example, an algal promoter operably linked with an algal-derived nucleotide sequence in nature). Suitable regulatory control sequences include regulatory control sequences not naturally associated with the nucleic acid molecule to be expressed (for example, an algal promoter of one species operatively linked to an nucleotide sequence of another organism or algal species). The latter regulatory control sequences can be a sequence that controls expression of another gene within the same species (for example, autologous) or can be derived from a different organism or species (for example, heterologous).

To determine whether a putative regulatory control sequence is suitable, the putative regulatory control sequence is linked to a nucleic acid molecule typically encodes a protein that produces an easily detectable signal.

The construction may then be introduced into an alga or other organism by standard techniques and expression thereof is monitored. For example, if the nucleic acid molecule encodes a dominant selectable marker, the alga or organism to be used is tested for the ability to grow in the presence of a compound for which the marker provides resistance.

In some cases, a regulatory control sequence is a promoter, such as a promoter adapted for expression of a nucleotide sequence in a non-vascular, photosynthetic organism. For example, the promoter may be an algal promoter, for example as described in U.S. Publ. Appl. Nos. 2006/0234368 and 2004/0014174, and in Hallmann, *Transgenic Plant J.* 1:81-98 (2007). The promoter maybe a chloroplast specific promoter or a nuclear promoter. The promoter may an EF1-α gene promoter or a D promoter. In some embodiments, the synthase is operably linked to the EF1-α gene promoter. In other embodiments, the synthase is operably linked to the D promoter.

A regulatory control sequences herein can be found in a variety of locations, including for example, coding and non-coding regions, 5' untranslated regions (for example, regions upstream from the coding region), and 3' untranslated regions (for example, regions downstream from the coding region). Thus, in some instances an autologous or heterologous nucleotide sequence can include one or more 3' or 5' untranslated regions, one or more introns, or one or more exons.

For example, in some embodiments, a regulatory control sequence can comprise a *Cyclotella cryptica* acetyl-CoA carboxylase 5' untranslated regulatory control sequence or a *Cyclotella cryptica* acetyl-CoA carboxylase 3'-untranslated regulatory control sequence (U.S. Pat. No. 5,661,017).

A regulatory control sequence may also encode chimeric or fusion polypeptides, such as protein AB, or SAA, that promotes expression of heterologous nucleotide sequences and proteins. Other regulatory control sequences include autologous intron sequences that may promote translation of a heterologous sequence.

The regulatory control sequences used in any of the expression vectors herein may be inducible. Inducible regulatory control sequences, such as promoters, can be inducible by light, for example. Regulatory control sequences may also be autoregulatable. Examples of autoregulatable regulatory control sequences include those that are autoregulated by, for example, endogenous ATP levels or by the product produced by the organism. In some instances, the regulatory control sequences may be inducible by an exogenous agent. Other inducible elements are well known in the art and may be adapted for use as described herein.

Various combinations of the regulatory control sequences described herein may be embodied and combined with other features described herein. In some cases, an expression vector comprises one or more regulatory control sequences operatively linked to a nucleotide sequence encoding a polypeptide that effects, for example, upregulates production of a product described herein. In some cases, an expression vector comprises one or more regulatory control sequences operatively linked to a nucleotide sequence encoding a polypeptide that effects, for example, upregulates production of a product.

A vector or other recombinant nucleic acid molecule may include a nucleotide sequence encoding a reporter polypeptide or other selectable marker. The term "reporter" or "selectable marker" refers to a polynucleotide (or encoded polypeptide) that confers a detectable phenotype. A reporter generally encodes a detectable polypeptide, for example, a green fluorescent protein or an enzyme such as luciferase, which, when contacted with an appropriate agent (a particular wavelength of light or luciferin, respectively) generates a signal that can be detected by eye or using appropriate instrumentation (Giacomin, *Plant Sci.* 116:59-72, 1996; Scikantha, *J. Bacteriol.* 178:121, 1996; Gerdes, *FEBS Lett.* 389:44-47, 1996; see, also, Jefferson, *EMBO J.* 6:3901-3907, 1997, fl-glucuronidase). A selectable marker generally is a molecule that, when present or expressed in a cell, provides a selective advantage (or disadvantage) to the cell containing the marker, for example, the ability to grow in the presence of an agent that otherwise would kill the cell.

A selectable marker can provide a means to obtain prokaryotic cells or plant cells or both that express the marker and, therefore, can be useful as a component of a vector (see, for example, Bock, supra, 2001). Examples of selectable markers include, but are not limited to, those that confer antimetabolite resistance, for example, dihydrofolate reductase, which confers resistance to methotrexate (Reiss, *Plant Physiol.* (*Life Sci. Adv.*) 13:143-149, 1994); neomycin phosphotransferase, which confers resistance to the aminoglycosides neomycin, kanamycin and paromycin (Herrera-Estrella, *EMBO J.* 2:987-995, 1983), hygro, which confers resistance to hygromycin (Marsh, *Gene* 32:481-485, 1984), trpB, which allows cells to utilize indole in place of tryptophan; hisD, which allows cells to utilize histinol in place of histidine (Hartman, *Proc. Natl. Acad. Sci., USA* 85:8047, 1988); mannose-6-phosphate isomerase which allows cells to utilize mannose (WO 94/20627); ornithine decarboxylase, which confers resistance to the ornithine decarboxylase inhibitor, 2-(difluoromethyl)-DL-ornithine (DFMO; McConlogue, 1987, In: Current Communications in Molecular Biology, Cold Spring Harbor Laboratory ed.); and deaminase from *Aspergillus terreus*, which confers resistance to Blasticidin S (Tamura, *Biosci. Biotechnol. Biochem.* 59:2336-2338, 1995). Additional selectable markers include those that confer herbicide resistance, for example, phosphinothricin acetyltransferase gene, which confers resistance to phosphinothricin (White et al., *Nucl. Acids Res.* 18:1062, 1990; Spencer et al., *Theor. Appl Genet.* 79:625-631, 1990), a mutant EPSPV-synthase, which confers glyphosate resistance (Hinchee et al., *BioTechnology* 91:915-922, 1998), a mutant acetolactate synthase, which confers imidazolione or sulfonylurea resistance (Lee et al., *EMBO J.* 7:1241-1248, 1988), a mutant psbA, which confers resistance to atrazine (Smeda et al., *Plant Physiol.* 103:911-917, 1993), or a mutant protoporphyrinogen oxidase (see U.S. Pat. No. 5,767,373), or other markers conferring resistance to an herbicide such as glufosinate. Selectable markers include polynucleotides that confer dihydrofolate reductase (DHFR) or neomycin resistance for eukaryotic cells and tetracycline; ampicillin resistance for prokaryotes such as *E. coli*; and beomycin, gentamycin, glyphosate, hygromycin, kanamycin, methotrexate, phleomycin, phosphinotricin, spectinomycin, streptomycin, sulfonamide and sulfonylurea resistance in plants (see, for example, Maliga et al., Methods in Plant Molecular Biology, Cold Spring Harbor Laboratory Press, 1995, page 39).

Reporter genes have been successfully used in chloroplasts of higher plants, and high levels of recombinant protein expression have been reported. In addition, reporter genes have been used in the chloroplast of *C. reinhardtii*, but, in most cases very low amounts of protein were produced. Reporter genes greatly enhance the ability to monitor gene expression in a number of biological organisms. In chloroplasts of higher plants, β-glucuronidase (uidA, Staub and Maliga, *EMBO J.* 12:601-606, 1993), neomycin phosphotransferase (nptII, Carrer et al., *Mol. Gen. Genet.* 241:49-56, 1993), adenosyl-3-adenyltransf-erase (aadA, Svab and Maliga, *Proc. Natl. Acad. Sci., USA* 90:913-917, 1993), and the *Aequorea victoria* GFP (Sidorov et al., *Plant J.* 19:209-216, 1999) have been used as reporter genes (Heifetz, *Biochemie* 82:655-666, 2000). Each of these genes has attributes that make them useful reporters of chloroplast gene expression, such as ease of analysis, sensitivity, or the ability to examine expression in situ. Based upon these studies, other heterologous proteins have been expressed in the chloroplasts of higher plants such as *Bacillus thuringiensis* Cry toxins, conferring resistance to insect herbivores (Kota et al., *Proc. Natl. Acad. Sci., USA* 96:1840-1845, 1999), or human somatotropin (Staub et al., *Nat. Biotechnol.* 18:333-338, 2000), a potential biopharmaceutical. Several reporter genes have been expressed in the chloroplast of the eukaryotic green alga, *C. reinhardtii*, including aadA (Goldschmidt-Clermont, *Nucl. Acids Res.* 19:4083-4089 1991; Zerges and Rochaix, *Mol. Cell Biol.* 14:5268-5277, 1994), uidA (Sakamoto et al., *Proc. Natl. Acad. Sci., USA* 90:477-501, 19933, Ishikura et al., *J. Biosci. Bioeng.* 87:307-314 1999), *Renilla* luciferase (Minko et al., *Mol. Gen. Genet.* 262:421-425, 1999) and the amino glycoside phosphotransferase from *Acinetobacter* baumanii, aphA6 (Bateman and Purton, *Mol. Gen. Genet* 263:404-410, 2000).

In some instances, the vectors will contain elements such as an *E. coli* or *S. cerevisiae* origin of replication. Such features, combined with appropriate selectable markers, allows for the vector to be "shuttled" between the target host cell and the bacterial and/or yeast cell. The ability to passage a shuttle vector in a secondary host may allow for more convenient manipulation of the features of the vector. For example, a reaction mixture containing the vector and putative inserted polynucleotides of interest can be transformed into prokaryote host cells such as *E. coli*, amplified and collected using routine methods, and examined to identify vectors containing an insert or construct of interest. If desired, the vector can be further manipulated, for example, by performing site directed mutagenesis of the inserted polynucleotide, then again amplifying and selecting vectors having a mutated polynucleotide of interest. A shuttle vector then can be introduced into plant cell chloroplasts, wherein a polypeptide of interest can be expressed and, if desired, isolated according to a method as disclosed herein.

A polynucleotide or recombinant nucleic acid molecule, can be introduced into plant chloroplasts using any method known in the art. A polynucleotide can be introduced into a cell by a variety of methods, which are well known in the art and selected, in part, based on the particular host cell. For example, the polynucleotide can be introduced into a plant cell using a direct gene transfer method such as electroporation or microprojectile mediated (biolistic) transformation using a particle gun, or the "glass bead method," or by pollen-mediated transformation, liposome-mediated transformation, transformation using wounded or enzyme-degraded immature embryos, or wounded or enzyme-degraded embryogenic callus (Potrykus, *Ann. Rev. Plant. Physiol. Plant Mol. Biol.* 42:205-225, 1991).

Plastid transformation is a routine and well known method for introducing a polynucleotide into a plant cell chloroplast (see U.S. Pat. Nos. 5,451,513, 5,545,817, and 5,545,818; WO 95/16783; McBride et al., *Proc. Natl. Acad. Sci., USA* 91:7301-7305, 1994). In some embodiments, chloroplast transformation involves introducing regions of chloroplast DNA flanking a desired nucleotide sequence, allowing for homologous recombination of the exogenous DNA into the target chloroplast genome. In some instances one to 1.5 kb flanking nucleotide sequences of chloroplast genomic DNA may be used. Using this method, point mutations in the chloroplast 16S rRNA and rps12 genes, which confer resistance to spectinomycin and streptomycin, can be utilized as selectable markers for transformation (Svab et al., *Proc. Natl. Acad. Sci., USA* 87:8526-8530, 1990), and can result in stable homoplasmic transformants, at a frequency of approximately one per 100 bombardments of target leaves.

Microprojectile mediated transformation also can be used to introduce a polynucleotide into a plant cell chloroplast (Klein et al., *Nature* 327:70-73, 1987). This method utilizes microprojectiles such as gold or tungsten, which are coated with the desired polynucleotide by precipitation with calcium chloride, spermidine or polyethylene glycol. The microprojectile particles are accelerated at high speed into a plant tissue using a device such as the BIOLISTIC PD-1000 particle gun (BioRad; Hercules Calif.). Methods for the transformation using biolistic methods are well known in the art (see, for example; Christou, *Trends in Plant Science* 1:423-431, 1996). Microprojectile mediated transformation has been used, for example, to generate a variety of transgenic plant species, including cotton, tobacco, corn, hybrid poplar and papaya. Important cereal crops such as wheat, oat, barley, sorghum and rice also have been transformed using microprojectile mediated delivery (Duan et al., *Nature Biotech.* 14:494-498, 1996; Shimamoto, *Curr. Opin. Biotech.* 5:158-162, 1994). The transformation of most dicotyledonous plants is possible with the methods described above. Transformation of monocotyledonous plants also can be transformed using, for example, biolistic methods as described above, protoplast transformation, electroporation of partially permeabilized cells, introduction of DNA using glass fibers, the glass bead agitation method, and the like.

Transformation frequency may be increased by replacement of recessive rRNA or r-protein antibiotic resistance genes with a dominant selectable marker, including, but not limited to the bacterial aadA gene (Svab and Maliga, *Proc. Natl. Acad. Sci., USA* 90:913-917, 1993). Approximately 15 to 20 cell division cycles following transformation are generally required to reach a homoplastidic state. It is apparent to one of skill in the art that a chloroplast may contain multiple copies of its genome, and therefore, the term "homoplasmic" or "homoplasmy" refers to the state where all copies of a particular locus of interest are substantially identical. Plastid expression, in which genes are inserted by homologous recombination into all of the several thousand copies of the circular plastid genome present in each plant cell, takes advantage of the enormous copy number advantage over nuclear-expressed genes to permit expression levels that can readily exceed 10% of the total soluble plant protein.

In some instances, a method can be performed by introducing a recombinant nucleic acid molecule into a chloroplast, wherein the recombinant nucleic acid molecule includes a first polynucleotide, which encodes at least one polypeptide (for example, 1, 2, 3, 4, or more). In some embodiments, a polypeptide is operatively linked to a second, third, fourth, fifth, sixth, seventh, eighth, ninth, tenth and/or subsequent polypeptide. For example, several enzymes in a hydrocarbon production pathway may be linked, either directly or indirectly, such that products produced by one enzyme in the pathway, once produced, are in close proximity to the next enzyme in the pathway.

For transformation of chloroplasts, a major benefit can be the utilization of a recombinant nucleic acid construct which contains both a selectable marker and one or more genes of interest. Typically, transformation of chloroplasts is performed by co-transformation of chloroplasts with two constructs: one containing a selectable marker and a second containing the gene(s) of interest. Screening of such transformants is laborious and time consuming for multiple reasons. First, the time required to grow some transformed organisms is lengthy. Second, transformants must be screened both for presence of the selectable marker and for the presence of the gene(s) of interest. Typically, secondary screening for the gene(s) of interest is performed by Southern blot (see, for example PCT/US2007/072465).

In chloroplasts, regulation of gene expression generally occurs after transcription, and often during translation initiation. This regulation is dependent upon the chloroplast translational apparatus, as well as nuclear-encoded regulatory factors (see Barkan and Goldschmidt-Clermont, *Biochemie* 82:559-572, 2000; Zerges, *Biochemie* 82:583-601, 2000). The chloroplast translational apparatus generally resembles that in bacteria; chloroplasts contain 70S ribosomes; have mRNAs that lack 5' caps and generally do not contain 3' poly-adenylated tails (Harris et al., *Microbiol. Rev.* 58:700-754, 1994); and translation is inhibited in chloroplasts and in bacteria by selective agents such as chloramphenicol.

Some methods as described herein take advantage of proper positioning of a ribosome binding sequence (RBS) with respect to a coding sequence. It has previously been noted that such placement of an RBS results in robust translation in plant chloroplasts (see U.S. Application 2004/0014174, incorporated herein by reference), and that polypeptides that an advantage of expressing polypeptides in chloroplasts is that the polypeptides do not proceed through cellular compartments typically traversed by polypeptides expressed from a nuclear gene and, therefore, are not subject to certain post-translational modifications such as glycosylation. As such, the polypeptides and protein complexes produced by some methods herein can be expected to be produced without such post-translational modification.

One or more codons of an encoding polynucleotide can be biased to reflect chloroplast and/or nuclear codon usage. Most amino acids are encoded by two or more different (degenerate) codons, and it is well recognized that various organisms utilize certain codons in preference to others. Such preferential codon usage, which also is utilized in chloroplasts, is referred to herein as "chloroplast codon usage". The codon bias of *Chlamydomonas* reinhardtii has been reported. See U.S. Application 2004/0014174. Examples of nucleic acids encoding isoprenoid biosynthetic enzymes which are biased for expression in *C. reinhardtii* are provided in Tables 5-8. Percent identity to the native sequence (in the organism from which the sequence was isolated) may be about 50%, about 60%, about 70%, about 80%, about 90% or higher. Some vectors comprise one or more of the nucleic provided in Table 5 and/or nucleic acids with about 70% identity thereto.

The term "biased," when used in reference to a codon, means that the sequence of a codon in a polynucleotide has been changed such that the codon is one that is used preferentially in the target which the bias is for, for example, alga cells, chloroplasts. A polynucleotide that is biased for chloroplast codon usage can be synthesized de novo, or can be genetically modified using routine recombinant DNA techniques, for example, by a site directed mutagenesis method, to change one or more codons such that they are biased for chloroplast codon usage. Chloroplast codon bias can be variously skewed in different plants, including, for example, in alga chloroplasts as compared to tobacco. Generally, the chloroplast codon bias selected reflects chloroplast codon usage of the plant which is being transformed with the nucleic acids. For example, where *C. reinhardtii* is the host, the chloroplast codon usage is biased to reflect alga chloroplast codon usage (about 74.6% AT bias in the third codon position).

Any of the products described herein can be prepared by transforming an organism to cause the production by such organism of the product. An organism is considered to be a photosynthetic organism even if a transformation event destroys or diminishes the photosynthetic capability of the transformed organism (for example, exogenous nucleic acid is inserted into a gene encoding a protein required for photosynthesis).

Pathways to be Modified.

The expression vectors herein can encode polypeptide(s) that promote the production of intermediates, products, precursors, and derivatives of the products described herein. For example, the expression vectors can encode polypeptide(s) that promote the production of intermediates, products, precursors, and derivatives in the isoprenoid pathway.

Isoprenoids, or terpenoids, are a group of organic chemicals related to terpenes. Terpenes are typically derived from isoprene units. Isoprene units are five-carbon units (C5). Terpenes are classified by the number of isoprene units, such as hemiterpenes (C5), monoterpenes (C10), sesquiterpenes (C15), diterpenes (C20), triterpenes (C30), tetraterpenes (C40), and polyterpenes ($C_n$, wherein "n" is equal to or greater than 45). Terpenes are hydrocarbons that can be modified (for example oxidized, methyl groups removed, etc.) or its carbon skeleton rearranged, to form derivatives of terpenes, such as isoprenoids. Isoprenoids include other steroids and lipids as well.

Terpene precursors are thought to be generated by two pathways. The mevalonate pathway, or RMG-CoA reductase pathway, generates dimethylallyl pyrophosphate (DMAPP) and isopentyl pyrophosphate (IPP), the common C5 precursor for terpenes. The non-mevalonate pathway is an alternative pathway to form DMAPP and IPP. The DMAPP and IPP may be condensed to form geranyl-diphosphate (GPP), or other precursors, such as farnesyl-diphosphate (FPP), geranylgeranyl-diphosphate (GGPP), from which higher isoprenes are formed.

An expression vector herein may encode polypeptide(s) having a role in the mevalonate pathway, such as, for example, thiolase, HMG-CoA synthase, HMG-CoA reductase, mevalonate kinase, phosphemevalonate kinase, and mevalonate-5-pyrophosphate decarboxylase. In other embodiments, the polypeptides are enzymes in the non-mevalonate pathway, such as DOXP synthase, DOXP reductase, 4-diphosphocytidyl-2-C-methyl-D-erythritol synthase, 4-diphophocytidyl-2-C-methyl-D-erythritol kinase, 2-C-methyl-D-erythritol 2,4,-cyclodiphosphate synthase, HMB-PP synthase, HMB-PP reductase, or DOXP reductoisomerase.

In other instances, an expression vector may comprise a nucleotide sequence encoding a polypeptide in an isoprenoid pathway, such as, for example, a synthase-encoding sequence. The synthase may be a C10, C15, C20, C30, or C40 synthase. In some embodiments, the synthase is botryococcene synthase, limonene synthase, 1,8 cineole synthase, α-pinene synthase, camphene synthase, (+)-sabinene synthase, myrcene synthase, abietadiene synthase, taxadiene synthase, farnesyl pyrophosphate synthase, amorphadiene synthase, (E)-α-bisabolene synthase, diapophytoene synthase, or diapophytoene desaturase. Examples of synthases and their sequences are described in Table 1.

TABLE 1

Examples of Synthases.

| Synthase | Source | NCBI protein ID |
|---|---|---|
| Limonene | M. spicata | 2ONH_A |
| Cineole | S. officinalis | AAC26016 |
| Pinene | A. grandis | AAK83564 |
| Camphene | A. grandis | AAB70707 |
| Sabinene | S. officinalis | AAC26018 |
| Myrcene | A. grandis | AAB71084 |
| Abietadiene | A. grandis | Q38710 |
| Taxadiene | T. brevifolia | AAK83566 |
| FPP | G. gallus | P08836 |
| Amorphadiene | A. annua | AAF61439 |
| Bisabolene | A. grandis | O81086 |
| Diapophytoene | S. aureus | |
| Diapophytoene desaturase | S. aureus | |
| GPPS-LSU | M. spicata | AAF08793 |
| GPPS-SSU | M. spicata | AAF08792 |
| GPPS | A. thaliana | CAC16849 |
| GPPS | C. reinhardtii | EDP05515 |
| FPP | E. coli | NP_414955 |
| FPP | A. thaliana | NP_199588 |
| FPP | A. thaliana | NP_193452 |
| FPP | C. reinhardtii | EDP03194 |
| IPP isomerase | E. coli | NP_417365 |
| IPP isomerase | H. pluvialis | ABB80114 |
| Limonene | L. angustifolia | ABB73044 |
| Monoterpene | S. lycopersicum | AAX69064 |
| Terpinolene | O. basilicum | AAV63792 |
| Myrcene | O. basilicum | AAV63791 |
| Zingiberene | O. basilicum | AAV63788 |
| Myrcene | Q. ilex | CAC41012 |
| Myrcene | P. abies | AAS47696 |
| Myrcene, ocimene | A. thaliana | NP_179998 |
| Myrcene, ocimene | A. thaliana | NP_567511 |
| Sesquiterpene | Z. mays; B73 | AAS88571 |
| Sesquiterpene | A. thaliana | NP_199276 |
| Sesquiterpene | A. thaliana | NP_193064 |
| Sesquiterpene | A. thaliana | NP_193066 |
| Curcumene | P. cablin | AAS86319 |
| Farnesene | M. domestica | AAX19772 |
| Farnesene | C. sativus | AAU05951 |
| Farnesene | C. junos | AAK54279 |
| Farnesene | P. abies | AAS47697 |
| Bisabolene | P. abies | AAS47689 |
| Sesquiterpene | A. thaliana | NP_197784 |
| Sesquiterpene | A. thaliana | NP_175313 |
| GPP Chimera GPPS-LSU + SSU fusion | | |
| Geranylgeranyl reductase | A. thaliana | NP_177587 |
| Geranylgeranyl reductase | C. reinhardtii | EDP09986 |
| Chlorophyllidohydrolase | C. reinhardtii | EDP01364 |
| Chlorophyllidohydrolase | A. thaliana | NP_564094 |
| Chlorophyllidohydrolase | A. thaliana | NP_199199 |
| Phosphatase | S. cerevisiae | AAB64930 |
| FPP A118W | G. gallus | |

The synthase may also be β-caryophyllene synthase, germacrene A synthase, 8-epicedrol synthase, valencene synthase, (+)-δ-cadinene synthase, germacrene C synthase, (E)-β-framesene synthase, casbene synthase, vetispiradiene synthase, 5-epi-aristolochene synthase, aristolchene synthase, α-humulene, (E,E)-α-framesene synthase, (−)-β-pinene synthase, γ-terpinene synthase, limonene cyclase, linalool synthase, (+)-bornyl diphosphate synthase, levopimaradiene synthase, isopimaradiene synthase, (E)-γ-bisabolene synthase, copalyl pyrophosphate synthase, kaurene synthase, longifolene synthase, γ-humulene synthase, α-selinene synthase, β-phellandrene synthase, terpinolene synthase, (+)-3-carene synthase, syn-copalyl diphosphate synthase, α-terpineol synthase, syn-pimara-7,15-diene synthase, ent-sandaaracopimaradiene synthase, sterner-13-ene synthase, E-α-ocimene, S-linalool synthase, geraniol synthase, γ-terpinene synthase, linalool synthase, E-β-ocimene synthase, epi-cedrol synthase, α-zingiberene synthase, guaiadiene synthase, cascarilladiene synthase, cis-muuroladiene synthase, aphidicolan-16b-ol synthase, elizabethatriene synthase, sandalol synthase, patchoulol synthase, zinzanol synthase, cedrol synthase, scareol synthase, copalol synthase, or manool synthase.

Pathways utilized herein may involve enzymes present in the cytosol, in a plastid (for example, chloroplast), or both. Exogenous nucleic acids encoding the enzymes of embodiments described herein may be introduced into a host cell, such that the enzyme encoded is active in the cytosol or in a plastid, or both. In some embodiments, a naturally occurring enzyme which is present in one intracellular compartment (for example, in the cytosol) may be expressed in a different intracellular locale (for example, in the chloroplast), or in both the naturally occurring and non-naturally occurring locales following transformation of the host cell.

To illustrate this concept, and merely by way of example, a non-vascular photosynthetic microalga species can be genetically engineered to produce an isoprenoid, such as limonene (a molecule of high value in the specialty chemical and petrochemical industries). Limonene is a monoterpene that is a pure hydrocarbon, only composed of hydrogen and carbon atoms. Limonene is not naturally produced in the species, *Chlamydomonas reinhardtii*. Production of limonene in these microalgae can be achieved by engineering the microalgae to express the heterologous enzyme limonene synthase in the chloroplast. Limonene synthase can convert the terpene precursor geranyl pyrophosphate into limonene. Unlike limonene, geranyl pyrophosphate is naturally present in the chloroplast of microalgae. The expression of the limonene synthase can be accomplished by inserting the heterologous gene encoding limonene synthase into the chloroplast genome of the microalgae. The modified strain of microalgae is then made homoplasmic to ensure that the limonene gene will be stably maintained in the chloroplast genome of all descendents. A microalgae is homoplasmic for a gene when the inserted gene is present in all copies of the chloroplast genome. It is apparent to one of skill in the art that a chloroplast may contain multiple copies of its genome, and therefore, the term "homoplasmic" or "homoplasmy" refers to the state where all copies of a particular locus of interest are substantially identical. Plastid expression, in which genes are inserted by homologous recombination into all of the several thousand copies of the circular plastid genome present in each plant cell, takes advantage of the enormous copy number advantage over nuclear-expressed genes to permit expression levels that can readily exceed 10% of the total soluble plant protein.

Expression.

Chloroplasts are a productive organelle of photosynthetic organisms and a site of large of amounts of protein synthesis. Any of the expression vectors herein may be selectively adapted for chloroplast expression. A number of chloroplast promoters from higher plants have been described in Kung and Lin, *Nucleic Acids Res.* 13: 7543-7549 (1985). Gene products may be expressed from the expression vector in the chloroplast. Gene products encoded by expression vectors may also be targeted to the chloroplast by chloroplast targeting sequences. For example, targeting an expression vector or the gene product(s) encoded by an expression vector to the chloroplast may further enhance the effects provided by the regulatory control sequences and sequence(s) encoding a protein or peptide that allows or improves production of a fuel molecule.

Various combinations of the chloroplast targeting described herein may be embodied and combined with other features described herein. For example, a nucleotide sequence encoding a terpene synthase may be operably linked to a nucleotide sequence encoding a chloroplast targeting sequence. A host cell may be transformed with an expression vector encoding limonene synthase targeted to the chloroplast, and thus, may produce more limonene synthase as compared to a host cell transformed with an expression vector encoding limonene synthase but not a chloroplast targeting sequence. The increased limonene synthase expression may produce more of the limonene in comparison to the host cell that produces less.

In yet another example, an expression vector comprising a nucleotide sequence encoding an enzyme that produces a product (for example fuel product, fragrance product, insecticide product) not naturally produced by the organism by using precursors that are naturally produced by the organism as substrates, is targeted to the chloroplast. By targeting the enzyme to the chloroplast, production of the product may be increased in comparison to a host cell wherein the enzyme is expressed, but not targeted to the chloroplast. Without being bound by theory, this may be due to increased precursors being produced in the chloroplast and thus, more product may be produced by the enzyme encoded by the introduced nucleotide sequence.

Methods

A product (for example fuel product, fragrance product, insecticide product) may be produced by a method that comprises the step of: growing/culturing a non-vascular organism transformed by one or more of the nucleic acids herein. The methods herein can further comprise the step of transforming the organism. Transformation can occur using any method known in the art or described herein. The methods herein can further comprise the step of collecting the product produced by the organism.

The methods herein may further comprise the step of providing to the organism a source of inorganic carbons, such as flue gas. In some instances, the inorganic carbon source provides all of the carbons necessary for making the product (for example, fuel product). The growing/culturing step preferably occurs in a suitable medium, such as one that has minerals and/or vitamins.

In a related yet distinct aspect, a method is provided for producing a product (for example fuel product, fragrance product, insecticide product) that comprises: transforming a photosynthetic organism with an expression vector, growing the organism; and collecting the product from the organism. The expression vector is typically the expression vector described herein, and is specifically used to add additional biosynthetic capacity to an organism or to modify an existing biosynthetic pathway within the organisms, either with the intension of increasing or allowing the production of a molecule by the photosynthetic organism.

The methods herein comprise selecting genes that are useful to produce products, such as fuels, fragrances, and insecticides, transforming a cell of a photosynthetic organism with such gene(s), and growing such organisms under conditions suitable to allow the product to be produced. Organisms can be cultured in conventional fermentation bioreactors, which include, but are not limited to, batch, fed-batch, cell recycle, and continuous fermentors. Further, they may be grown in photobioreactors (see for example US Appl. Publ. No. 20050260553; U.S. Pat. Nos. 5,958,761; 6,083,740). Culturing can also be conducted in shake flasks, test tubes, microtiter dishes, and petri plates. Culturing is carried out at a temperature, pH and oxygen content appropriate for the recombinant cell. Such culturing conditions are well within the expertise of one of ordinary skill in the art.

A host organism may also be grown on land, for example, landfills. In some cases, host organism(s) are grown near ethanol production plants or other facilities or regions (for example, cities, highways, etc.) generating $CO_2$. As such, the methods herein contemplate business methods for selling carbon credits to ethanol plants or other facilities or regions generating $CO_2$ while making fuels by growing one or more of the modified organisms described herein near the ethanol production plant.

Further, the organisms may be grown in outdoor open water, such as ponds, the ocean, sea, rivers, waterbeds, marsh water, shallow pools, lakes, reservoirs, etc. When grown in water, the organisms can be contained in a halo like object comprising of lego-like particles. The halo object encircles the algae and allows it to retain nutrients from the water beneath while keeping it in open sunlight.

In some instances, organisms can be grown in containers wherein each container comprises 1 or 2 or a plurality of organisms. The containers can be configured to float on water. For example, a container can be filled by a combination of air and water to make the container and the host organism(s) in it buoyant. A host organism that is adapted to grow in fresh water can thus be grown in salt water (for example, the ocean) and vice versa. This mechanism allows for automatic death of the organism if there is any damage to the container.

In some instances a plurality of containers can be contained within a halo-like structure as described above. For example, up to 100, 1,000, 10,000, 100,000, or 1,000,000 containers can be arranged in a meter-square of a halo-like structure.

In some embodiments, the product (for example fuel product, fragrance product, insecticide product) is collected by harvesting the organism. The product may then be extracted from the organism.

In some embodiments, the expression of the product (for example fuel product, fragrance product, insecticide product) is inducible. The product may be induced to be expressed. Expression may be inducible by light. In yet other embodiments, the production of the product is auto-regulatable. The product may form a feedback loop, wherein when the product (for example fuel product, fragrance product, insecticide product) reaches a certain level, expression of the product may be inhibited. In other embodiments, the level of a metabolite of the organism inhibits expression of the product. For example, endogenous ATP produced by the organism as a result of increased energy production to express the product, may form a feedback loop to inhibit expression of the product. In yet another embodiment, production of the product may be inducible, for example, by light or an exogenous agent. For example, an expression vector for effecting production of a product in the host organism may comprise an inducible regulatory control sequence that is activated or inactivated by an exogenous agent.

Methods or processes described herein can also relate to methods for screening for new genes/expression vectors to create any of the fuel products described herein. Such methods comprise the steps of: (1) inserting a candidate expression vector of nucleic acids into a photosynthetic organism, (2) collecting a putative fuel product produced there from, (3) applying the putative fuel product to a mass spectrometer to determine a characteristic of the putative fuel product, and whether it may be used as a fuel product. In some embodiments, step (2) may comprise collecting a known fuel product and whether a candidate expression vector increases production of the fuel product relative to a photosynthetic organism without the candidate expression vector.

III. Business Methods

Also provided herein is a business method of selling carbon credits comprising: obtaining a measurement of a $\delta^{13}C$ distribution of a composition; and comparing the $\delta^{13}C$ distribution of the composition to a reference $\delta^{13}C$ distribution; selling carbon credits to an entity if the $\delta^{13}C$ distribution of the composition is less than the reference $\delta^{13}C$ distribution, wherein the entity is an owner or user of the composition. In some instances, the reference $\delta^{13}C$ distribution is about −32‰. In another embodiment, the reference $\delta^{13}C$ distribution is the maximum $\delta^{13}C$ distribution of petroleum. In yet another instance, the reference $\delta^{13}C$ distribution is about −32‰, −35‰, −40‰, −45‰, −50‰, −55, or −60‰. The method may further comprise labeling the composition using the measurement. The method may further comprise tracking the composition.

A business method is also provided herein that comprises providing a carbon credit to a party growing a non-vascular, photosynthetic organism adapted to produce a fuel product. In some instances, the photosynthetic organism is genetically modified. The method of producing a fuel product provides a possibly more environmentally friendly way of generating fuel products relative to current methods. As such, the methods and compositions described herein may be used in a business method in exchange for carbon credits.

Carbon credits may be an allowance, permit, credit, or the like which are or have been allowed, authorized, or recognized by some relevant sovereign entity (such as but not limited to a city (including municipalities of all sizes and types including both incorporated and unincorporated municipalities), a county, a state or province, or a nation, as well as related governmental entities such regional, multi-national, or other international bodies such as the United Nations or the European Union).

The carbon credit may be substantially received directly from a regulatory agency or administrative entity. In other instances, they may be received indirectly, for example, an entity using the methods or compositions herein may receive the carbon credits directly from a regulatory agency, and may then transfer the carbon credits to another entity. Transfer of the carbon credit may be in association with a given process, product using the genetically modified non-vascular, photosynthetic organism adapted to produce a fuel product.

For example, a first entity may be identified that provides a consumable product that is distributed for consumption in an end-user mobile platform, wherein the consumption and/or production of the consumable product includes a corresponding resultant emission. For example, combustion of diesel fuel often results in the environmental release of corresponding nitrogen oxides and combustion of gasoline often results in the environmental release of corresponding sulfur oxide.

The first party may adopt a method of producing its products using the non-vascular photosynthetic organisms described above, or use the products generated by the non-vascular photosynthetic organisms described above in their compositions, resulting in less harmful effects on the environment than conventional methods of generating, for example, diesel fuel, gasoline, jet fuel and the like. A method thus off-sets the environmental effects of the end product.

The first party may then receive a carbon, or emission, credit as a result of a reduction of the total emission. The carbon credit may be received from a regulatory or administrative agency, or may be transferred to the first party from a second party, wherein the second party may have sold the non-vascular photosynthetic organism or the products of the non-vascular photosynthetic organism to the first party.

The carbon credit may be exchanged for a substantially liquid monetary instrument. For example, the carbon credit may be exchanged for a cash equivalent, such as cash, check, and the like. The carbon credit may also be exchanged for a legal grant regarding an intellectual property right, for example, but not limited to, an assignment or a license. The carbon credit may also be exchanged for a government tax subsidy or access to purchasers of a given market. The carbon credit may also be exchanged for use of another carbon emission process, such as one not comprising growing the organism. For example, a party may have a limited number of emissions it may release in a time period, for example, a month or a year, and going over the limit may incur fines and penalties. However, with carbon credits, the party going over the limit may exchange of carbon credits to offset the fines or penalties or may be taken into account when determining the amount of emissions generated by the party.

The business methods can also involve the production of products such as fuel products, fragrances, etc., while selling carbon credits.

The business methods herein also contemplate selling products other than fuel products, such as fragrances and insecticides. Business methods associated with fuel products, including those involving the use of carbon credits, are also relevant to the production of other types of useful products and materials.

An additional method provided herein is a method of labeling a composition comprising: obtaining a measurement of a $\delta^{13}C$ distribution of the composition; and labeling the composition using the measurement. In some embodiments, the labeling comprises denoting the $\delta^{13}C$ distribution of the composition. In some embodiments, the labeling comprises denoting the $\delta^{13}C$ distribution of the composition and the measurement of the $\delta^{13}C$ distribution of the composition is less than −32‰. In an instance the composition is a fuel product that can comprise a fuel component. Labeling may comprise adding a physical label to the composition or adding a physical label to a package containing the composition. The labeling step may comprise a computer readable label and/or a label denoting a renewable resource. In some aspects, a method described herein may further comprise the step of tracking the composition. In some instances, the tracking comprises: 1) comparing a carbon isotope distribution of an unknown composition to the measurement; 2) identifying the location of the composition, and/or; 3) monitoring the composition with a computer system.

While exemplary embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

EXAMPLE 1

Production of Monoterpene Synthases in *C. reinhardtii*

In this example a nucleic acids encoding limonene synthase from *M. spicata* was introduced into *C. reinhardtii*. Transforming DNA is shown graphically in FIG. 1A. In this instance the segment labeled "Transgene" is the gene encoding limonene synthase that is regulated by the 5' UTR and promoter sequence for the psbA gene from *C. reinhardtii* and the 3' UTR for the psbA gene from *C. reinhardtii*, and the segment labeled "Selection Marker" is the kanamycin resistance encoding gene from bacteria, which is regulated by the 5' UTR and promoter sequence for the atpA gene from *C. reinhardtii* and the 3' UTR sequence for the rbcL gene from *C. reinhardtii*. The transgene cassette is targeted to the psbA loci of *C. reinhardtii* via the segments labeled "Homology A" and "Homology B," which are identical to sequences of DNA flanking the psbA locus on the 5' and 3' sides, respectively. All DNA manipulations carried out in the construction of this transforming DNA were essentially as described by Sambrook et al., *Molecular Cloning: A Laboratory Manual* (Cold Spring Harbor Laboratory Press 1989) and Cohen et al., *Meth. Enzymol.* 297, 192-208, 1998.

For these experiments, all transformations were carried out on *C. reinhardtii* strain 137c (mt+). Cells were grown to late log phase (approximately 7 days) in the presence of 0.5 mM 5-fluorodeoxyuridine in TAP medium (Gorman and Levine, *Proc. Natl. Acad. Sci., USA* 54:1665-1669, 1965, which is incorporated herein by reference) at 23° C. under constant illumination of 450 Lux on a rotary shaker set at 100 rpm. Fifty ml of cells were harvested by centrifugation at 4,000×g at 23° C. for 5 min. The supernatant was decanted and cells resuspended in 4 ml TAP medium for subsequent chloroplast transformation by particle bombardment (Cohen et al., supra, 1998). All transformations were carried out under kanamycin selection (100 µg/ml) in which resistance was conferred by the gene encoded by the segment in FIG. 1A labeled "Selection Marker." (Chlamydomonas Stock Center, Duke University).

PCR was used to identify transformed strains. For PCR analysis, $10^6$ algae cells (from agar plate or liquid culture) were suspended in 10 mM EDTA and heated to 95° C. for 10 minutes, then cooled to near 23° C. A PCR cocktail consisting of reaction buffer, MgCl2, dNTPs, PCR primer pair(s), DNA polymerase, and water was prepared. Algae lysate in EDTA was added to provide template for reaction. Magnesium concentration is varied to compensate for amount and concentration of algae lysate in EDTA added. Annealing temperature gradients were employed to determine optimal annealing temperature for specific primer pairs.

To identify strains that contain the limonene synthase gene, a primer pair was used in which one primer anneals to a site within the psbA 5'UTR and the other primer anneals within the limonene synthase coding segment. Desired clones are those that yield a PCR product of expected size. To determine the degree to which the endogenous gene locus is displaced (heteroplasmic vs. homoplasmic), a PCR reaction consisting of two sets of primer pairs were employed (in the same reaction). The first pair of primers amplifies the endogenous locus targeted by the expression vector and consists of a primer that anneals within the psbA 5'UTR and one that anneals within the psbA coding region. The second pair of primers amplifies a constant, or control region that is not targeted by the expression vector, so should produce a product of expected size in all cases. This reaction confirms that the absence of a PCR product from the endogenous locus did not result from cellular and/or other contaminants that inhibited the PCR reaction. Concentrations of the primer pairs are varied so that both reactions work in the same tube; however, the pair for the endogenous locus is 5× the concentration of the constant pair. The number of cycles used was >30 to increase sensitivity. The most desired clones are those that yield a product for the constant region but not for the endogenous gene locus. Desired clones are also those that give weak-intensity endogenous locus products relative to the control reaction.

Cultivation of *C. reinhardtii* transformants for expression of limonene synthase was carried out in liquid TAP medium at 23° C. in the dark on a rotary shaker set at 100 rpm, unless stated otherwise. Cultures were maintained at a density of $1×10^7$ cells per ml for at least 48 hr prior to harvest.

Figure 2A:
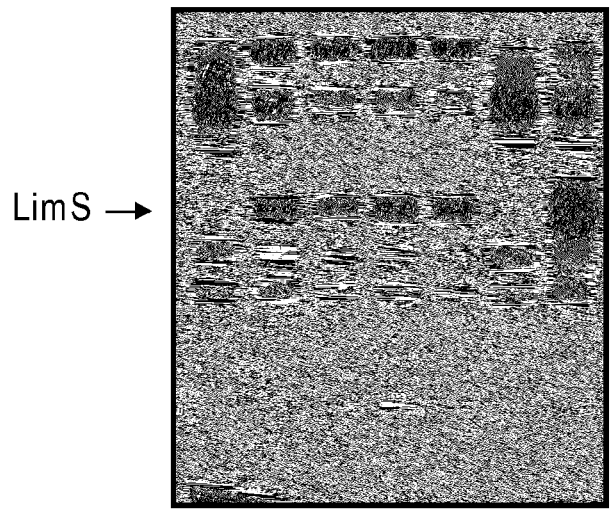
FIG. 2 shows Western analysis of *C. reinhardtii* transformed with limonene synthase.
Figure 2B:
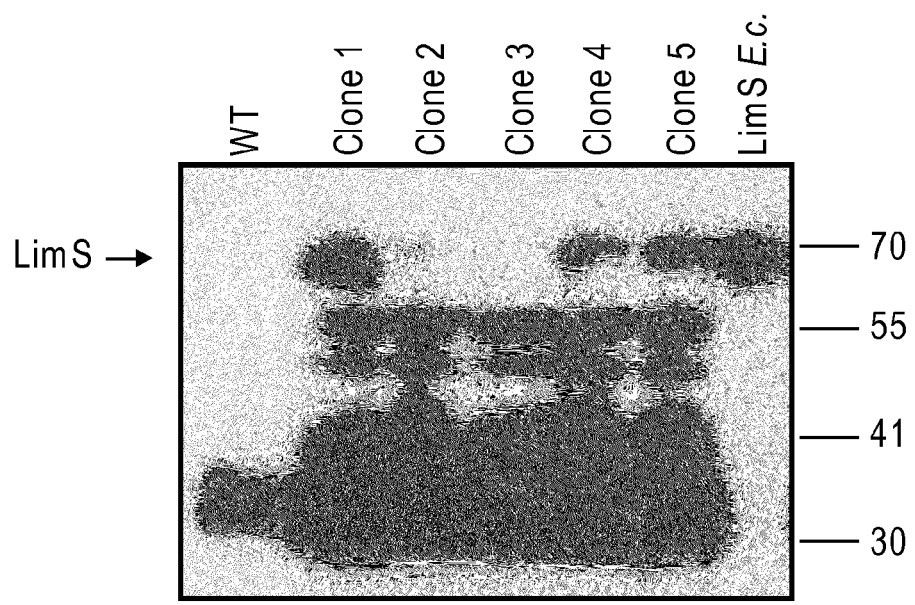

To determine if the limonene synthase gene led to expression of the limonene synthase in transformed algae cells, both soluble proteins were immunopreciptated and visualized by Western blot. Briefly, 500 ml of algae cell culture was harvested by centrifugation at 4000×g at 4° C. for 15 min. The supernatant was decanted and the cells resuspended in 10 ml of lysis buffer (100 mM Tris-HCl, pH=8.0, 300 mM NaCl, 2% Tween-20). Cells were lysed by sonication (10×30 sec at 35% power). Lysate was clarified by centrifugation at 14,000×g at 4° C. for 1 hour. The supernatant was removed and incubated with anti-FLAG antibody-conjugated agarose resin at 4° C. for 10 hours. Resin was separated from the lysate by gravity filtration and washed 3× with wash buffer ((100 mM Tris-HCl, pH=8.0, 300 mM NaCl, 2% Tween-20). Results from Western blot analysis of multiple samples (FIG. 2) show that limonene synthase is indeed produced.

Figure 3:
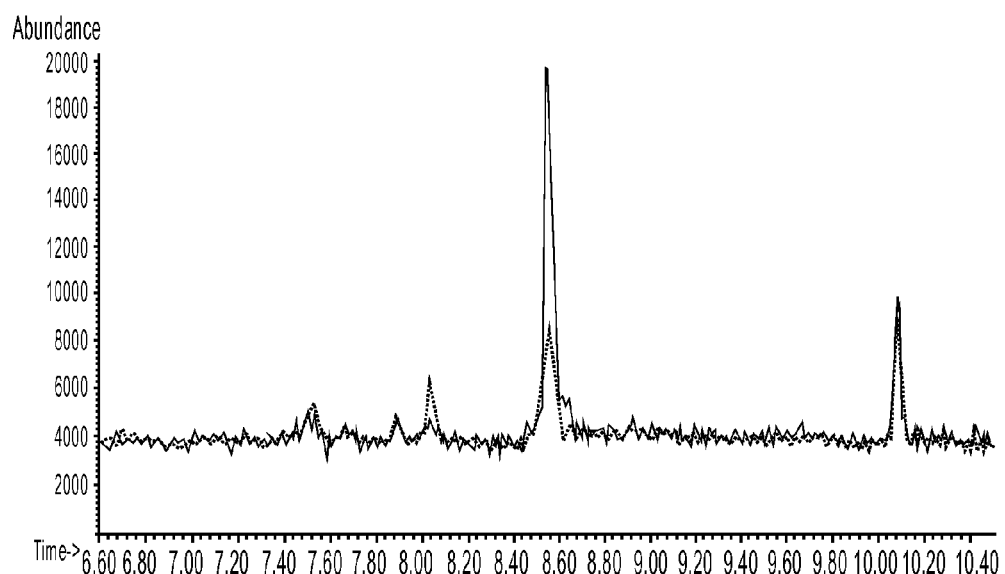
FIG. 3 shows gas chromatography-mass spectrometry analysis of *C. reinhardtii* transformed with limonene synthase.
Figure 3:
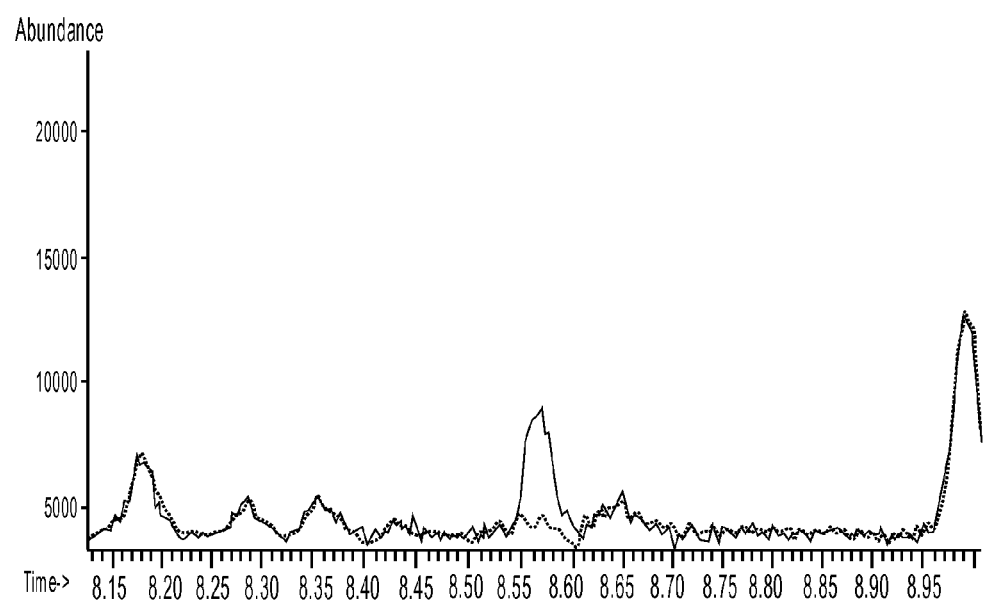

To determine whether limonene synthase produced in the algae chloroplast is a functional enzyme, limonene production from GPP was examined. Briefly, 50 uL of the limonene synthase-bound agarose (same samples prepared above) was suspend in 300 uL of reaction buffer (25 mM HEPES, pH=7.2, 100 mM KCl, 10 mM MnCl2, 10% glycerol, and 5 mM DTT) with 0.33 mg/mL GPP and transferred to a glass vial. The reaction was overlaid with heptane and incubated at 23° C. for 12 hours. The reaction was quenched and extracted by vortexing the mixture. 0.1 mL of heptane was removed and the sample was analyzed by GC-MS. Results are shown in FIG. 3.

Limonene synthase activity from crude cell lysates was also examined. Briefly, 50 mL of algae cell culture was harvested by centrifugation at 4000×g at 4° C. for 15 min. The supernatant was decanted and the cells resuspended in 0.5 mL of reaction buffer (25 mM HEPES, pH=7.2, 100 mM KCl, 10 mM $MnCl_2$, 10% glycerol, and 5 mM DTT). Cells were lysed by sonication (10×30 sec at 35% power). 0.33 mg/mL of GPP was added to the lysate and the mixture was transferred to a glass vial. The reaction was overlaid with heptane and incubated at 23° C. for 12 hours. The reaction was quenched and extracted by vortexing the mixture. 0.1 mL of heptane was removed and the sample was analyzed by GC-MS. Results are shown in FIG. 3.

EXAMPLE 2

Production of FPP Synthases and Sesquiterpene Synthases in *C. reinhardtii*

In this example a nucleic acids encoding FPP synthase from *G. gallus* and zingiberene synthase from *O. basilicum* were introduced into *C. reinhardtii*. Transforming DNA is shown graphically in FIG. 1C. In this instance the segment labeled "Transgene 1" is the gene encoding FPP synthase that is regulated by the 5' UTR and promoter sequence for the psbD gene from *C. reinhardtii* and the 3' UTR for the psbA gene from *C. reinhardtii*, the segment labeled "Transgene 2" is the gene encoding zingiberene synthase that is regulated by the 5' UTR and promoter sequence for the psbD gene from *C. reinhardtii* and the 3' UTR for the psbA gene from *C. reinhardtii*, and the segment labeled "Selection Marker" is the kanamycin resistance encoding gene from bacteria, which is regulated by the 5' UTR and promoter sequence for the atpA gene from *C. reinhardtii* and the 3' UTR sequence for the rbcL gene from *C. reinhardtii*. The transgene cassette is targeted to the 3HB locus of *C. reinhardtii* via the segments labeled "Homology C" and "Homology D," which are identical to sequences of DNA flanking the 3HB locus on the 5' and 3' sides, respectively. All DNA manipulations carried out in the construction of this transforming DNA were essentially as described by Sambrook et al., Molecular Cloning: A Laboratory Manual (Cold Spring Harbor Laboratory Press 1989) and Cohen et al., *Meth. Enzymol.* 297, 192-208, 1998.

For these experiments, all transformations were carried out on *C. reinhardtii* strain 137c (mt+). Cells were grown to late log phase (approximately 7 days) in the presence of 0.5 mM 5-fluorodeoxyuridine in TAP medium (Gorman and Levine, *Proc. Natl. Acad. Sci., USA* 54:1665-1669, 1965, which is incorporated herein by reference) at 23° C. under constant illumination of 450 Lux on a rotary shaker set at 100 rpm. Fifty ml of cells were harvested by centrifugation at 4,000×g at 23° C. for 5 min. The supernatant was decanted and cells resuspended in 4 ml TAP medium for subsequent chloroplast transformation by particle bombardment (Cohen et al., supra, 1998). All transformations were carried out under kanamycin selection (100 µg/ml) in which resistance was conferred by the gene encoded by the segment in FIG. 1C labeled "Selection Marker." (Chlamydomonas Stock Center, Duke University).

PCR was used to identify transformed strains. For PCR analysis, $10^6$ algae cells (from agar plate or liquid culture) were suspended in 10 mM EDTA and heated to 95° C. for 10 minutes, then cooled to near 23° C. A PCR cocktail consisting of reaction buffer, MgCl2, dNTPs, PCR primer pair(s), DNA polymerase, and water was prepared. Algae lysate in EDTA was added to provide template for reaction. Magnesium concentration is varied to compensate for amount and concentration of algae lysate in EDTA added. Annealing temperature gradients were employed to determine optimal annealing temperature for specific primer pairs. To identify strains that contain the FPP synthase gene, a primer pair was used in which one primer anneals to a site within the psbD 5'UTR and the other primer anneals within the FPP synthase coding segment. To identify strains that contain the zingiberene synthase gene, a primer pair was used in which one primer anneals to a site within the psbD 5'UTR and the other primer anneals within the zingiberene synthase coding segment. Desired clones are those that yield a PCR product of expected size in both reactions. To determine the degree to which the endogenous gene locus is displaced (heteroplasmic vs. homoplasmic), a PCR reaction consisting of two sets of primer pairs were employed (in the same reaction). The first pair of primers amplifies the endogenous locus targeted by the expression vector. The second pair of primers amplifies a constant, or control region that is not targeted by the expression vector, so should produce a product of expected size in all cases. This reaction confirms that the absence of a PCR product from the endogenous locus did not result from cellular and/or other contaminants that inhibited the PCR reaction. Concentrations of the primer pairs are varied so that both reactions work in the same tube; however, the pair for the endogenous locus is 5× the concentration of the constant pair. The number of cycles used was >30 to increase sensitivity. The most desired clones are those that yield a product for the constant region but not for the endogenous gene locus. Desired clones are also those that give weak-intensity endogenous locus products relative to the control reaction.

Figure 4:
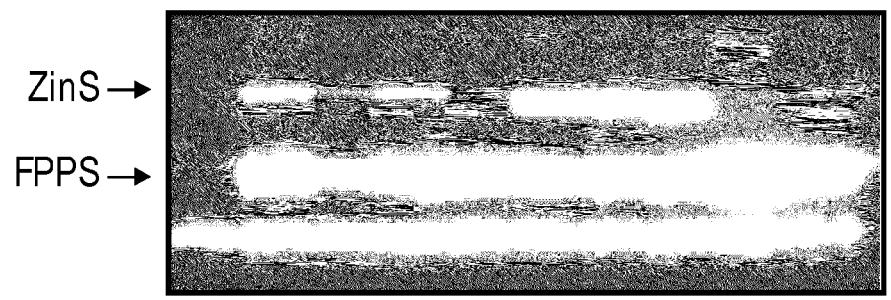
FIG. 4 shows Western analysis of *C. reinhardtii* transformed with FPP synthase and sesquiterpene synthase.

To ensure that the presence of the FPP synthase and zingiberene synthase genes led to expression of the FPP synthase and zingiberene synthase enzymes, a Western blot was performed. Approximately $1 \times 10^8$ algae cells were collected from TAP agar medium and suspended in 0.05 ml of lysis buffer (Bugbuster; Novagen). Solutions were heated to 95° C. for 5 min and then cooled to 23° C. Lysate was mixed 3:1 with loading buffer (XT Sample buffer; Bio-Rad), samples were heated to 95° C. for 1 min, cooled to 23° C., and insoluble proteins were removed by centrifugation. Soluble proteins were separated by SDS-PAGE, followed by transfer to PVDF membrane. The membrane was blocked with TBST+5% dried, nonfat milk at 23° C. for 30 min, incubated with anti-FLAG antibody (diluted 1:2,500 in TBST+5% dried, nonfat milk) at 4° C. for 10 hours, washed three times with TBST, incubated with horseradish-linked anti-mouse antibody (diluted 1:5,000 in TBST+5% dried, nonfat milk) at 23° C. for 1 hour, and washed three times with TBST. Proteins were visualized with chemiluminescent detection. Results from multiple clones (FIG. 4) show expression of the GPP synthase gene in *C. reinhardtii* cells resulted in production of the protein.

Cultivation of *C. reinhardtii* transformants for expression of FPP synthase and zingiberene synthase was carried out in liquid TAP medium at 23° C. under constant illumination of 5,000 Lux on a rotary shaker set at 100 rpm, unless stated otherwise. Cultures were maintained at a density of $1 \times 10^7$ cells per ml for at least 48 hr prior to harvest.

To determine whether FPP synthase and zingiberene synthase produced in the algae chloroplast are functional, sesquiterpene production from DMAPP and FPP is examined. Briefly, 50 mL of algae cell culture is harvested by centrifugation at 4000×g at 4° C. for 15 min. The supernatant is decanted and the cells resuspended in 0.5 mL of reaction buffer (25 mM HEPES, pH=7.2, 100 mM KCl, 10 mM $MnCl_2$, 10% glycerol, and 5 mM DTT). Cells are lysed by sonication (10×30 sec at 35% power). 0.33 mg/mL of FPP are added to the lysate and the mixture transferred to a glass vial. The reaction is overlaid with heptane and incubated at 23° C. for 12 hours. The reaction is quenched and extracted by vortexing the mixture. 0.1 mL of heptane is removed and the sample analyzed by gas chromatography-mass spectrometry (GC-MS).

EXAMPLE 3

$\delta^{13}C$ Distribution Measurements of Samples Including Algae Grown in Contact with Flue Gas The technique used for liquid sample analysis was EA-IRMS (elemental analyser isotope ratio mass spectrometry). In this technique, samples and references are weighed into tin capsules, sealed, and loaded into an auto-sampler on a Europa Scientific elemental analyser. The samples can then be dropped in sequence into a furnace held at 1000° C. and combusted in the presence of oxygen. The tin capsules flash combust, raising the temperature in the region of the sample to ~1700° C. The combusted gases are swept in a helium stream over combustion catalyst ($Cr_2O_3$), copper oxide wires (to oxidize hydrocarbons), and silver wool to remove sulfur and halides. The resultant gases, $N_2$, $NO_x$, $H_2O$, $O_2$, and $CO_2$ are swept through a reduction stage of pure copper wires held at 600° C. This removes any oxygen and converts $NO_x$ species to $N_2$. A magnesium perchlorate chemical trap is used to remove water. Nitrogen and carbon dioxide are separated using a packed column gas chromatograph held at a constant temperature of 100° C. The resultant carbon dioxide peak enters the ion source of the Europa Scientific 20-20 IRMS where it is ionized and accelerated. Gas species of different mass are separated in a magnetic field then simultaneously measured using a Faraday cup collector array to measure the isotopomers of $CO_2$ at m/z 44, 45, and 46. The analysis proceeds in a batch process by which a reference is analysed followed by a number of samples and then another reference. The reference material used for analysis included IA-R001 (Iso-Analytical working standard flour, $\delta^{13}C_{VPDB}$=−26.43‰). IAEA-CH-6 (IAEA sucrose standard, $\delta^{13}C_{VPDB}$=−10.43‰) and IA-R005 (Iso-Analytical working standard beet sugar standard, $\delta^{13}C_{VPDB}$=−26.03‰) were measured for quality control during analysis of the samples. IAEA-CH-6 is an inter-laboratory comparison standard distributed by the International Energy Agency (IAEA). IA-R001 and IA-R006 are calibrated against and traceable to IAEA-CH-6. The reference material used for carbon-13 analysis included Iso-Analytical Mineral Oil standard (IA-R002) with a $\delta^{13}C$ value of −28.06‰ vs. PDB. IA-R002 is traceable to NBS-22 (Mineral Oil), distributed by the IAEA, with an accepted $\delta^{13}C$ value of −29.81‰ vs. PDB. IA-R002, IA-R024 (Iso-Analytical olive oil standard, $\delta^{13}C$ of −29.27‰, traceable to NBS-22) and IA-R044 (Iso-Analytical corn oil standard, $\delta^{13}C$ of −16.27‰, traceable to NBS-22) were used as quality control check samples within each batch analysis of the samples.

The technique used for analysis of carbon dioxide samples was GC-IRMS (gas chromatography isotope ratio mass spectrometry). In this technique, an aliquot of sample gas is taken from the gas bag (fitted with a septum) using a syringe and needle. The gas sample is injected onto a packed column gas chromatograph (Column type: Porapak Q, 80/100 mesh, 6'×¼" SS), to resolve carbon dioxide and which is held at an isothermal GC temperature of 40° C. The flow rate through the column was approximately 60 ml/min using a column pressure of 20 psi. The resultant chromatographic peak for $CO_2$ enters the ion source of a Europa Scientific 20-20 IRMS where it is ionized and accelerated. Gas species of different mass are separated in a magnetic field then simultaneously measured using a Faraday cup collector array to measure masses 44, 45, and 46 for $^{13}C$ analysis. Samples of reference gas ($CO_2$) are injected into the GC-IRMS using the same flow paths as the sample. The reference gas used to determine the $\delta^{13}C$ value of the sample gases was LA-R060 ($\delta^{13}C$=−35.63‰ vs. V-PDB). IA-R060 is traceable to NBS-19 ($\delta^{13}C$ value of +1.95‰ vs. V-PDB), which is distributed as an isotope reference standard by the International Energy Agency, Vienna. Samples of IA-R060 were analysed as check samples along with the samples for quality control.

The results of the experiments of measuring the $\delta^{13}C$ distribution of a variety of sample compounds including, crop plants (such as beet sugar, sucrose, olive oil, corn oil, wheat flour, and cane sugar), gas samples (such as ambient air and flue gas), and crude petroleum oil. As a comparison, the $\delta^{13}C$ distribution of algae samples (algae grown on ambient air, algae grown on limited carbon dioxide flue gas, and algae grown on excess carbon dioxide flue gas) was measured to demonstrate the carbon fixation incorporation of carbon from the sources of inorganic carbon into organic molecules, such as fuel products or compositions described herein. The results of are summarized in FIG. 5.

Crop plants, typically grown in ambient air, demonstrated an average $\delta^{13}C$ distribution of −20.02‰. The range of values of the $\delta^{13}C$ distribution of crop plants was −10.43‰ (for sucrose) to −29.28‰ (for olive oil). Other $\delta^{13}C$ values for crop plants included −11.66‰ for cane sugar, −16.22‰ for corn oil, −26.03‰ for beet sugar, and −26.47‰ for wheat flour. All of these $\delta^{13}C$ values are greater than −32‰.

Petroleum crude oil samples were taken from 9 different sources. The average $\delta^{13}C$ of crude oil samples was −27.76‰ and ranged from −26.77‰ to −30.18‰. These values are consistent with literature values of the $\delta^{13}C$ of fossil fuels. All of these $\delta^{13}C$ values are greater than −32‰, and therefore, do not demonstrate the $\delta^{13}C$ distribution of a product or composition extracted from a recently grown (within 50 years) photosynthetic organism that is in contact with flue gas or a source of inorganic carbons from fossil fuel as described herein.

Figure 5:
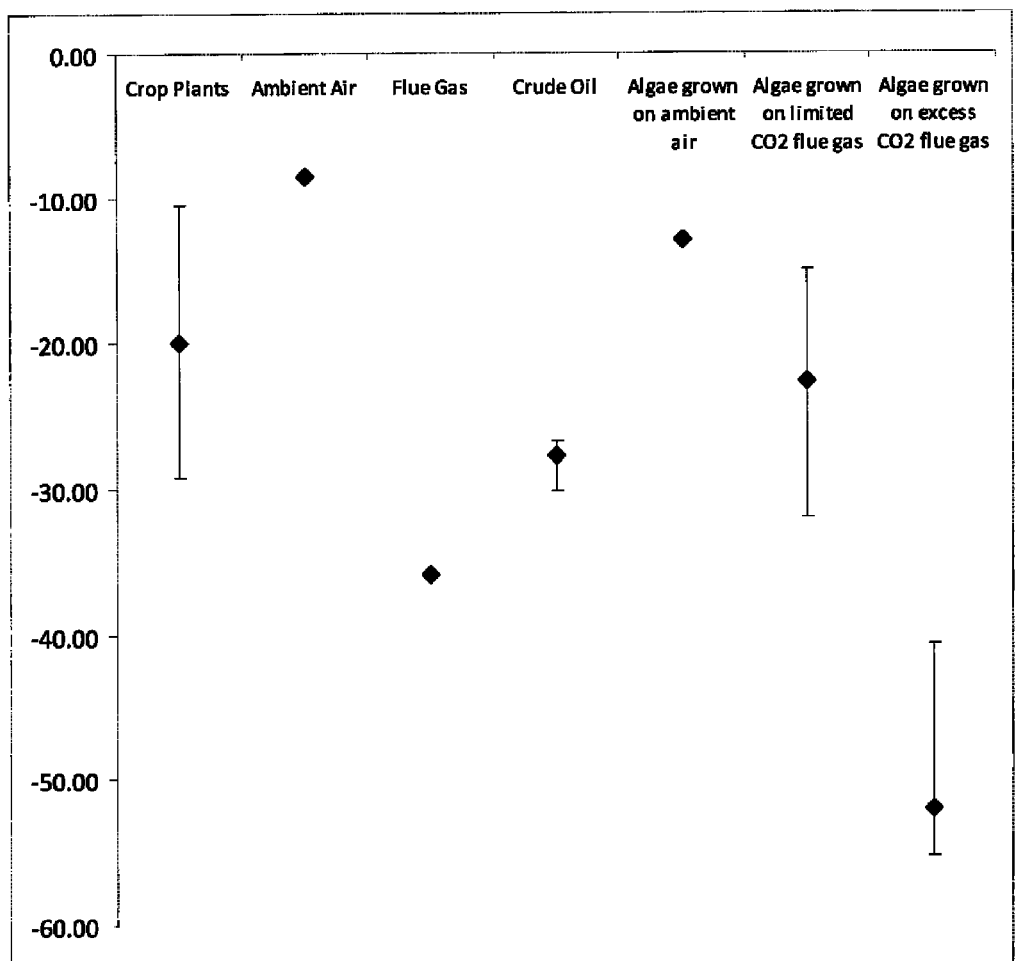
FIG. 5 summarizes the results of experiments of measuring the $\delta^{13}C$ distribution of a variety of sample compounds including, crop plants, gas samples, crude petroleum oil, and algae samples.

Flue gas demonstrated a $\delta^{13}C$ distribution of −35.92‰ as shown in FIG. 5. Flue gas can be from the combustion of petroleum or fossil fuel products. As a comparison, ambient air $\delta^{13}C$ distribution is considered to be about −8 to −8.5‰.

Algae was grown by bubbling gas through a photobioreactor. Three different types of algae were grown: one grown in contact with ambient air, one grown in contact with limited flue gas, and one grown in contact with excess flue gas. For example, the algae grown on limited flue gas were bubbled a gas of with a carbon dioxide from flue gas, wherein the amount of carbon dioxide in the gas was similar to amount of carbon dioxide in ambient air (or less than about 1%). For example, the algae grown on excess flue gas were bubbled a gas of that comprise carbon dioxide from flue gas, wherein the amount of carbon dioxide in the provided gas was about 3-7% (or about 5%) of the total amount of the gas. Also, two other sample of algae were analyzed, algae grown on limited flue gas at a separate facility in an open pond, and algae grown on mostly excess flue gas at a separate facility. The algae samples were then dried and combusted to measure the $\delta^{13}C$ distribution of the samples as described in this example herein.

The results of the measurement of the $\delta^{13}C$ distribution of the samples of algae grown on ambient air, limited flue gas, and excess flue gas are illustrated in FIG. 5. One sample of algae grown on ambient air had a $\delta^{13}C$ distribution of −12.90‰. This result is expected, because as discussed, photosynthetic organisms can have a preference for $^{12}C$ over $^{13}C$ during photosynthesis, for example, due to the RuBisCO enzyme as described herein. Therefore, the photosynthetic organism and the organic molecules therein should have a $\delta^{13}C$ distribution less than the $\delta^{13}C$ distribution of the inorganic carbon source.

Six samples of algae were analyzed that were grown on limited flue gas and had an average $\delta^{13}C$ distribution of −22.57‰ and a range of −14.87 to −32.03‰. The variance can be due to the amount of flue gas provided, the rate of the flue gas, a difference in algal species that may have more efficient carbon fixation or RuBisCO, or the amount of light provided to the organism during growth. As an example, two algae samples provided the highest $\delta^{13}C$ at −14.87 and −16.28‰, both of these samples were grown in contact with a higher amount of bicarbonate than the other four samples. Bicarbonate has a greater $\delta^{13}C$ value than flue gas and is also a source of inorganic carbons for the algae, therefore the values are most likely lower due to the carbon fixation of both bicarbonate and flue gas in these organisms.

Five samples of algae were analyzed that were grown on excess flue gas and had an average $\delta^{13}C$ distribution of −52.06‰ and a range of −40.65 to −55.34‰. The excess flue gas was flue gas provided by combustion of a fossil fuel. The values of the $\delta^{13}C$ of algae grown on excess flue gas are all less than −32‰. The organic molecules within the algae have been carbon fixated with the inorganic carbons of the flue gas, such that the molecules have a low $\delta^{13}C$ distribution, a lower $\delta^{13}C$ distribution than that found in petroleum or other fossil fuels. Compositions and/or fuel products can be extracted and purified from the algae comprising a $\delta^{13}C$ distribution of less than −32‰ (for example, 40.65 to −55.34‰). The compositions can be the same or similar to petroleum compositions that are used for fuel products, except the $\delta^{13}C$ distribution is less than the known $\delta^{13}C$ distribution of petroleum and the $\delta^{13}C$ distribution of petroleum as measured in this example.

What is claimed is:

1. A method of generating a fuel product from an aquatic non-vascular $C_3$ photosynthetic organism comprising:
   a. growing an aquatic non-vascular $C_3$ photosynthetic organism in an excess of fossil fuel inorganic carbons such that carbon fixation during growth within said aquatic non-vascular $C_3$ photosynthetic organism is not limited by the availability of inorganic carbons, wherein said aquatic non-vascular $C_3$ photosynthetic organism generates a first fuel product; and
   b. incorporating carbons from said fossil fuel inorganic carbons into said first fuel product, wherein said first fuel product has a $\delta^{13}C$ distribution of less than −40‰.

2. The method of claim 1, wherein said fossil fuel inorganic carbons comprises carbon dioxide comprising $^{13}C$ and carbon dioxide comprising $^{12}C$.

3. The method of claim 1, wherein said aquatic non-vascular $C_3$ photosynthetic organism comprises one or more nucleic acids encoding one or more enzymes whose end product is said first fuel product.

4. The method of claim 3, wherein said nucleic acids are heterologous.

5. The method of claim 1, wherein said first fuel product is not naturally produced by said aquatic non-vascular $C_3$ photosynthetic organism.

6. The method of claim 1, wherein said first fuel product comprises a terpene or terpenoid.

7. The method of claim 1, wherein said fossil fuel inorganic carbons have a $\delta^{13}C$ distribution of greater than −32‰.

8. The method of claim 1, further comprising extracting said first fuel product.

9. The method of claim 8, further comprising refining said first fuel product.

10. The method of claim 9, wherein said refining comprises at least one of the processes selected from the group consisting of the following: hydrocracking, catalytic cracking, steam cracking, cracking, fractionating, distilling, hydrotreating, and any combination thereof.

11. The method of claim 8, further comprising creating a second fuel product comprising said first fuel product and a fuel component.

12. The method of claim 1, further comprising combusting said first fuel product and thus generating $\delta^{13}C$ enriched inorganic carbons.

13. The method of claim 12, wherein said $\delta^{13}$ enriched inorganic carbons have a $\delta^{13}C$ distribution of less than −40‰.

14. The method of claim 1, wherein said first fuel product has a $\delta^{13}C$ distribution of less than −45‰.

15. The method of claim 1, wherein said first fuel product has a $\delta^{13}C$ distribution of less than −50‰.

16. The method of claim 1, wherein said first fuel product has a $\delta^{13}C$ distribution of less than −55‰.

17. The method of claim 1, wherein said first fuel product has a $\delta^{13}C$ distribution of less than −60‰.

18. The method of claim 1, wherein said aquatic non-vascular $C_3$ photosynthetic organism is an alga.

19. The method of claim 1, wherein said aquatic non-vascular $C_3$ photosynthetic organism is a cyanobacterium.

* * * * *